US011483815B2

(12) United States Patent
Yang et al.

(10) Patent No.: US 11,483,815 B2
(45) Date of Patent: Oct. 25, 2022

(54) INFORMATION PROCESSING METHOD AND TERMINAL DEVICE

(71) Applicant: HUAWEI TECHNOLOGIES CO., LTD., Shenzhen (CN)

(72) Inventors: Yubo Yang, Shanghai (CN); Guohua Zhou, Shanghai (CN); Yinan Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 255 days.

(21) Appl. No.: 16/780,912

(22) Filed: Feb. 4, 2020

(65) Prior Publication Data

US 2020/0178224 A1 Jun. 4, 2020

Related U.S. Application Data

(63) Continuation of application No. PCT/CN2018/096626, filed on Jul. 23, 2018.

(30) Foreign Application Priority Data

Aug. 4, 2017 (CN) .......................... 201710662818.3

(51) Int. Cl.
*H04W 72/04* (2009.01)
*H04W 28/26* (2009.01)
(52) U.S. Cl.
CPC ......... *H04W 72/042* (2013.01); *H04W 28/26* (2013.01)
(58) Field of Classification Search
CPC ........................... H04W 72/042; H04W 28/26
See application file for complete search history.

(56) References Cited

U.S. PATENT DOCUMENTS

| 2013/0138807 | A1 | 5/2013 | Perkuhn et al. |
| 2016/0014789 | A1 | 1/2016 | Abe et al. |
| 2016/0192201 | A1 | 6/2016 | Wang |
| 2017/0171781 | A1 | 6/2017 | Seo et al. |
| 2018/0035332 | A1* | 2/2018 | Agiwal ............ H04W 74/0858 |

(Continued)

FOREIGN PATENT DOCUMENTS

| CN | 101179839 A | 5/2008 |
| CN | 102939785 A | 2/2013 |

(Continued)

OTHER PUBLICATIONS

Samsung,"Indication of reserved resources",3GPP TSG RAN WG1 #88bis R1-1705385,Spokane, USA, Apr. 3-7, 2017,total 3 pages.

(Continued)

*Primary Examiner* — Elton Williams
(74) *Attorney, Agent, or Firm* — Hauptman Ham, LLP

(57) ABSTRACT

Embodiments provide an information processing method and a terminal device, so that a network device can indicate a reserved resource, and the terminal device can process the reserved resource. In these embodiments, configuration information of a reserved resource sent by a network device can be received by a terminal device. The terminal device can determine, based on the configuration information of the reserved resource, that a resource type of the reserved resource is a first-type reserved resource or a second-type reserved resource. The terminal device can determine a radio frequency processing manner on the reserved resource based on the resource type.

16 Claims, 9 Drawing Sheets

(56) References Cited

U.S. PATENT DOCUMENTS

2018/0124687 A1* 5/2018 Park .................. H04L 5/1469
2019/0357218 A1  11/2019 Hou et al.
2020/0288482 A1* 9/2020 Yi .................... H04W 72/1278

FOREIGN PATENT DOCUMENTS

| CN | 105338392 A  | 2/2016 |
| CN | 106341772 A  | 1/2017 |
| CN | 106982468 A  | 7/2017 |
| WO | 2010008252 A2 | 1/2010 |
| WO | 2014108090 A1 | 7/2014 |
| WO | 2014121442 A1 | 8/2014 |

OTHER PUBLICATIONS

Chinese Office Action issued in corresponding Chinese Application No. 201710662818.3, dated May 17, 2021, pp. 1-6.
India Office Action issued in corresponding India Patent Application No. 201937042522, dated Mar. 17, 2021, pp. 1-5, Kolkata, India.

* cited by examiner

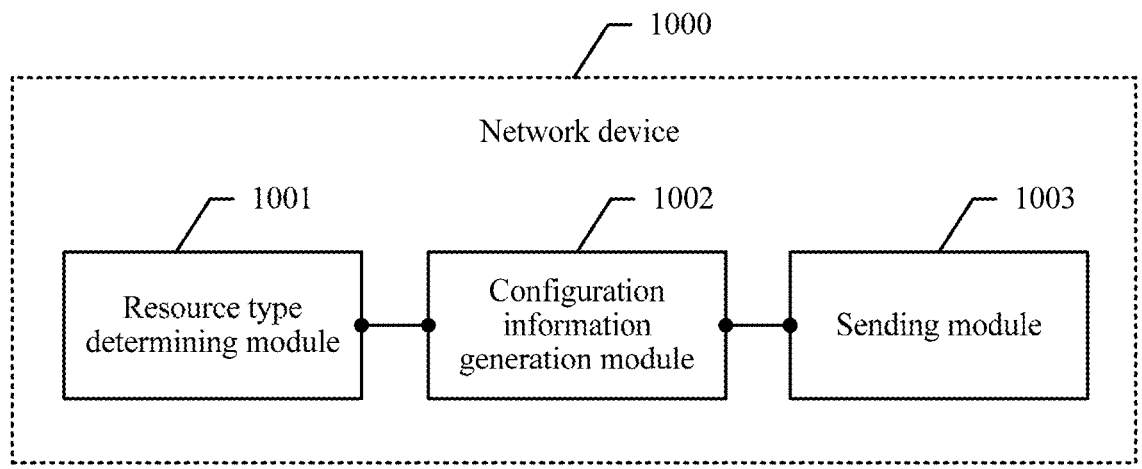
FIG. 10-a
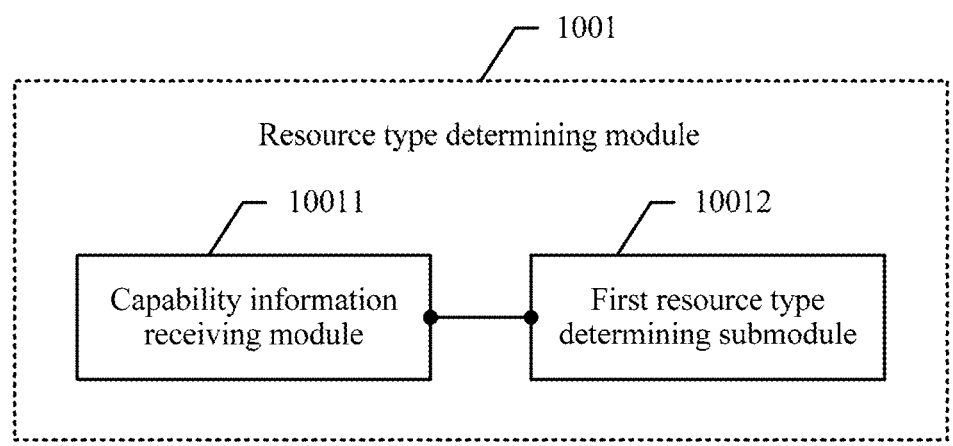
FIG. 10-b

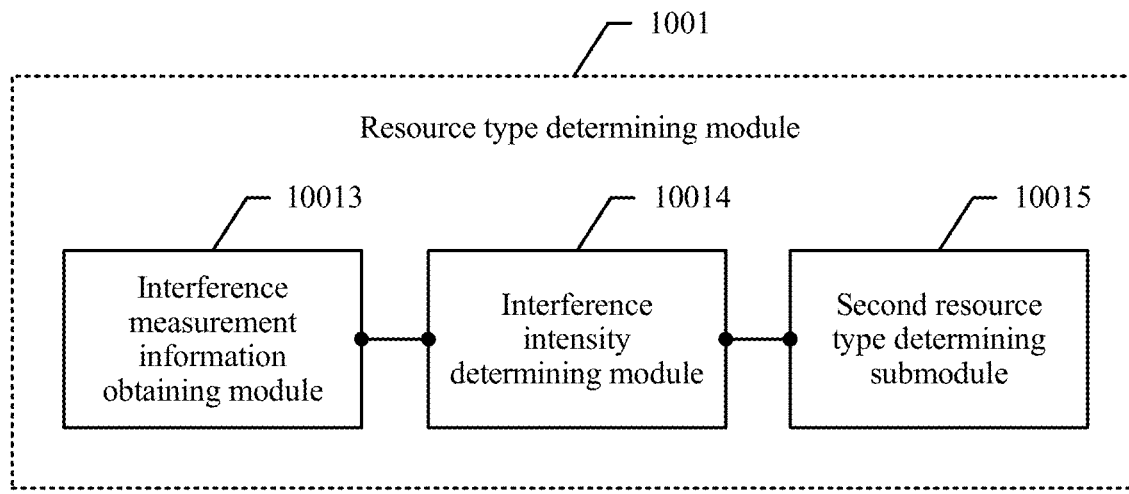
FIG. 10-c
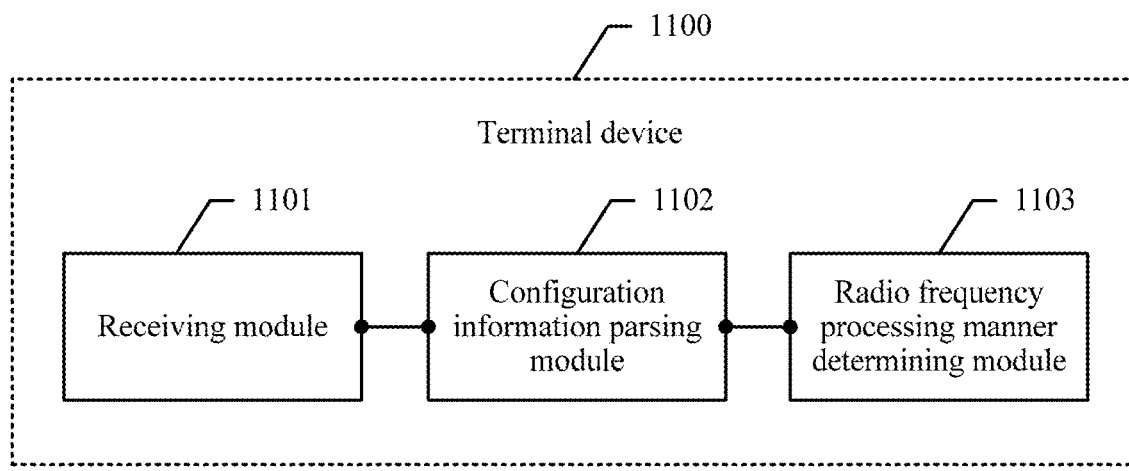
FIG. 11-a

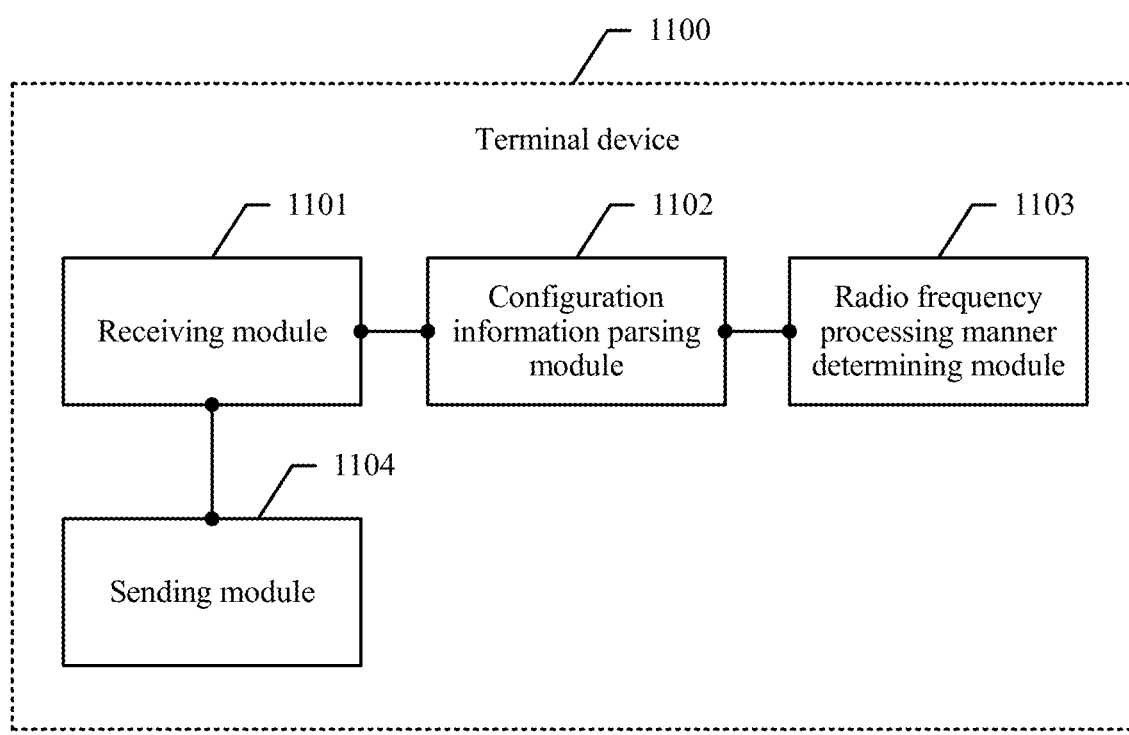
FIG. 11-b

INFORMATION PROCESSING METHOD AND TERMINAL DEVICE

CROSS-REFERENCE TO RELATED APPLICATIONS

This application is a continuation of International Application No. PCT/CN2018/096626, filed on Jul. 23, 2018, which claims priority to Chinese Patent Application No. 201710662818.3, filed on Aug. 4, 2017. The disclosures of the aforementioned applications are hereby incorporated by reference in their entireties.

TECHNICAL FIELD

This application relates to the field of communications technologies, and in particular, to an information processing method and a terminal device.

BACKGROUND

During a discussion on a current fifth-generation (5th-Generation, 5G) mobile communications technology, coexistence of a new radio (New Radio, NR) carrier and a long term evolution (Long Term Evolution, LTE) carrier is a to-be-standardized topic. The international telecommunication union (International Telecommunication Union, ITU) defines three types of application scenarios for 5G and future mobile communications systems: enhanced mobile broadband (enhanced Mobile Broadband, eMBB), ultra-reliable and low latency communications (Ultra Reliable and Low Latency Communications, URLLC), and massive machine type communication (massive Machine Type Communications, mMTC).

Different services have different requirements for a mobile communications system. How to better support all data transmission requirements of a plurality of different services is a technical problem that needs to be resolved in a current 5G mobile communications system. For example, how to support both a URLLC service and an eMBB service is one of discussion hot topics of the current 5G mobile communications system. In a scenario in which the URLLC service and the eMBB service coexist, a base station needs to reserve some resources for a common control area of the eMBB service, and these resources reserved by the base stations are unavailable to UE of the URLLC service. For example, in an application scenario in which LTE and NR coexist, the base station needs to send a cell reference signal (Cell Reference Signal, CRS) on some symbols in an LTE system, and therefore resources for sending the CRS are the resources reserved by the base station in an NR system.

In conclusion, a specific solution to how a base station side and a terminal side determine these reserved resources is not provided in the prior art, and consequently indicating the reserved resources becomes a to-be-resolved problem.

SUMMARY

Embodiments provide an information processing method and a terminal device, so that a network device can indicate a reserved resource, and the terminal device can process the reserved resource.

To resolve the foregoing technical problem, various embodiments provide the following technical solutions.

According to a first aspect, an embodiment provides an information indication method. The method includes: determining, by a network device, a resource type of a reserved resource, where different resource types of the reserved resource are corresponding to different receiving and processing manners of a terminal device; generating, by the network device, configuration information of the reserved resource, where the configuration information is used to indicate type information of the resource type; and sending, by the network device, the configuration information of the reserved resource to the terminal device.

In this embodiment, the network device may configure the resource type of the reserved resource, and the network device sends the configuration information of the reserved resource to the terminal device, so that the network device can indicate the type of the reserved resource to the terminal device, and the terminal device can parse the configuration information of the reserved resource, to determine a receiving and processing manner used by the terminal device. In this embodiment, the network device may indicate the resource type of the reserved resource by using the configuration information of the reserved resource, so as to implement processing manners of the network device and the terminal device for the reserved resource.

In some embodiments, different resource types of the reserved resource are corresponding to different radio frequency processing manners of the terminal device. The terminal device may use the different radio frequency processing manners for the different resource types indicated by the network device. For example, the terminal device determines that quantities of radio frequency filters used for the different resource types are different, or the terminal device determines whether to perform radio frequency receiving at a specific frequency or some frequencies for the different resource types.

In some embodiments, the determining, by a network device, a resource type of a reserved resource includes: determining, by the network device, that the resource type of the reserved resource is a first-type reserved resource or a second-type reserved resource. In this embodiment, the resource type of the reserved resource includes at least the first-type reserved resource or the second-type reserved resource. For example, the network device first determines that the resource type of the reserved resource is the first-type reserved resource. For another example, the network device first determines that the resource type of the reserved resource is the second-type reserved resource. Then, the network device may clearly distinguish the different resource types of the reserved resource by determining the first-type reserved resource and the second-type reserved resource.

In some embodiments, the determining, by the network device, that the resource type of the reserved resource is a first-type reserved resource or a second-type reserved resource includes: receiving, by the network device, capability information of the terminal device that is reported by the terminal device; and determining, by the network device based on the capability information of the terminal device, that the resource type of the reserved resource is the first-type reserved resource or the second-type reserved resource. In this embodiment, the terminal device may report the capability information of the terminal device to the network device by using a wireless network. The network device receives the capability information of the terminal device, the network device parses the capability information to determine a terminal capability of the terminal device, and the network device determines, based on the terminal capability of the terminal device, a resource type that matches the terminal capability, so that the network device can determine a specific resource type of the reserved resource based on the capability information of the terminal device.

In some embodiments, the capability information of the terminal device includes at least one of the following information: information about a quantity of radio frequency filters supported by the terminal device, information about a center frequency of a radio frequency filter, information about a bandwidth supported by a radio frequency filter, and information about whether the terminal device has a frequency domain windowing capability.

In some embodiments, the determining, by the network device, that the resource type of the reserved resource is a first-type reserved resource or a second-type reserved resource includes: obtaining, by the network device, interference measurement information of the reserved resource; determining, by the network device based on the interference measurement information, an interference intensity corresponding to the reserved resource; and determining, by the network device based on the interference intensity corresponding to the reserved resource, that the resource type of the reserved resource is the first-type reserved resource or the second-type reserved resource. In this embodiment, the network device may obtain the interference measurement information of the reserved resource. The interference measurement information obtained by the network device may be obtained in an uplink interference measurement process, or may be obtained in a downlink interference measurement process. A detailed interference measurement process is not limited herein. After the network device obtains the interference measurement information, the network device may set an interference intensity threshold, to determine the interference intensity corresponding to the reserved resource, so as to determine, by using a level of the interference intensity, that an interference type of the reserved resource is a high interference type or a low interference type.

In some embodiments, the first-type reserved resource includes a radio frequency RF-level reserved resource, and the second-type reserved resource includes a baseband BB-level reserved resource; or the first-type reserved resource includes a high interference-type reserved resource, and the second-type reserved resource includes a low interference-type reserved resource.

In some embodiments, the sending, by the network device, the configuration information of the reserved resource to the terminal device includes: sending, by the network device, radio resource control RRC signaling to the terminal device; and when a state of a first information element IE in the RRC signaling is a first state, indicating the first-type reserved resource, or when a state of a first IE in the RRC signaling is a second state, indicating the second-type reserved resource. In this embodiment, the network device may indicate the configuration information of the reserved resource by using the RRC signaling. For example, the network device configures the first IE in the RRC signaling, and the first IE has a plurality of states. For example, the first IE may include the first state and the second state, and different states may indicate different types of reserved resources.

In some embodiments, the sending, by the network device, the configuration information of the reserved resource to the terminal device includes: sending, by the network device, downlink control information DCI to the terminal device; and when a state of a first field in the DCI is a third state, indicating the first-type reserved resource, or when a state of a first field in the DCI is a fourth state, indicating the second-type reserved resource. In this embodiment, the network device may indicate the configuration information of the reserved resource by using the DCI. For example, the network device configures the first field in the DCI, and the first field has a plurality of states. For example, the first field may include the third state and the fourth state, and different states may indicate different types of reserved resources.

In some embodiments, the sending, by the network device, the configuration information of the reserved resource to the terminal device includes: sending, by the network device, the configuration information of the reserved resource to the terminal device by using a system message, where the system message may include a master information block MIB, remaining minimum system information RMSI, or other system information SI. In this embodiment, the network device may indicate the configuration information of the reserved resource to the terminal device by using the system message, so that the terminal device can parse the system message, to obtain the configuration information of the reserved resource that is indicated by the network device.

In some embodiments, the method further includes: sending, by the network device, configuration information for shutdown to the terminal device, where the configuration information for shutdown is used to indicate whether the network device performs a shutdown behavior. In this embodiment, the network device may perform the shutdown behavior on some symbols. The shutdown behavior means that when there is no data on some time domain symbols that needs to be sent by a base station, the network device shuts down a power amplifier on these symbols, so as to reduce system power consumption. A smaller cell service load contributes to better power saving. The network device may indicate, to the terminal device by using the configuration information for shutdown, whether the network device performs the shutdown behavior.

In some embodiments, the method further includes: sending, by the network device, phase configuration information to the terminal device, where the phase configuration information is used to indicate whether an adjacent transmission phase is continuous. The adjacent transmission phase is a phase between adjacent data channels, or a phase between adjacent pilots, or a phase between a data channel and a pilot that are adjacent. The network device may indicate, to the terminal device by using the phase configuration information, whether the adjacent transmission phase is continuous, so that the terminal device can determine, by using the phase configuration information, whether joint estimation can be performed.

In some embodiments, the reserved resource is a time-frequency resource that is reserved by the network device for another terminal device having a different device type from the terminal device.

In some embodiments, the method further includes: determining, by the network device, a frequency domain location of the reserved resource, where in this implementation scenario, the configuration information of the reserved resource is further used to indicate the frequency domain location of the reserved resource.

According to a second aspect, an embodiment provides an information indication method, including: receiving, by a terminal device, configuration information of a reserved resource that is sent by a network device; determining, by the terminal device, a resource type of the reserved resource based on the configuration information of the reserved resource; and determining, by the terminal device, a receiving and processing manner on the reserved resource based on the resource type.

In this embodiment, the terminal device may receive the configuration information of the reserved resource that is sent by the network device, and then the terminal device parses the configuration information of the reserved resource, to determine the receiving and processing manner used by the terminal device. In this embodiment, the network device may indicate the resource type of the reserved resource by using the configuration information of the reserved resource, so as to implement processing manners of the network device and the terminal device for the reserved resource.

In some embodiments, the determining, by the terminal device, a receiving and processing manner on the reserved resource based on the resource type includes: determining, by the terminal device, a radio frequency processing manner on the reserved resource based on the resource type. In this embodiment, different resource types of the reserved resource are corresponding to different radio frequency processing manners of the terminal device. The terminal device may use the different radio frequency processing manners for the different resource types indicated by the network device. For example, the terminal device determines that quantities of radio frequency filters used for the different resource types are different, or the terminal device determines whether to perform radio frequency receiving at a specific frequency or some frequencies for the different resource types, or bandwidths of radio frequency filters used by the terminal device are different.

In some embodiments, the receiving, by a terminal device, configuration information of a reserved resource that is sent by a network device includes: receiving, by the terminal device, radio resource control RRC signaling sent by the network device; parsing, by the terminal device, a first information element IE in the RRC signaling; and when a state of the first IE is a first state, determining that the reserved resource is a first-type reserved resource, or when a state of the first IE is a second state, determining, by the terminal device, that the reserved resource is a second-type reserved resource. In this embodiment, the network device may indicate the configuration information of the reserved resource by using the RRC signaling. For example, the network device configures the first IE in the RRC signaling, and the first IE has a plurality of states. For example, the first IE may include the first state and the second state, and different states may indicate different types of reserved resources.

In some embodiments, the receiving, by a terminal device, configuration information of a reserved resource that is sent by a network device includes: receiving, by the terminal device, downlink control information DCI sent by the network device; and the determining, by the terminal device, a resource type of the reserved resource based on the configuration information of the reserved resource includes: parsing, by the terminal device, a first field in the DCI; and when a state of the first field is a third state, determining that the reserved resource is the first-type reserved resource, or when a state of the first field is a fourth state, determining that the reserved resource is the second-type reserved resource. In this embodiment, the network device may indicate the configuration information of the reserved resource by using the DCI. For example, the network device configures the first field in the DCI, and the first field has a plurality of states. For example, the first field may include the third state and the fourth state, and different states may indicate different types of reserved resources.

In some embodiments, the receiving, by a terminal device, configuration information of a reserved resource that is sent by a network device includes: receiving, by the terminal device, a system message sent by the network device, where the system message may include a master information block MIB, remaining minimum system information RMSI, or another system information block SIB; and parsing, by the terminal device, the system message, to obtain the configuration information of the reserved resource. In this embodiment, the network device may indicate the configuration information of the reserved resource to the terminal device by using the system message, so that the terminal device can parse the system message, to obtain the configuration information of the reserved resource that is indicated by the network device.

In some embodiments, before the receiving, by a terminal device, configuration information of a reserved resource that is sent by a network device, the method further includes: reporting, by the terminal device, capability information of the terminal device to the network device.

In some embodiments, the method further includes: receiving, by the terminal device, configuration information for shutdown sent by the network device; and determining, by the terminal device based on the configuration information for shutdown, whether the network device performs a shutdown behavior. In this embodiment, the network device may perform the shutdown behavior on some symbols. The shutdown behavior means that when there is no data on some time domain symbols that needs to be sent by a base station, the network device shuts down a power amplifier on these symbols, so as to reduce system power consumption. A smaller cell service load contributes to better power saving. The network device may indicate, to the terminal device by using the configuration information for shutdown, whether the network device performs the shutdown behavior.

In some embodiments, the method further includes: receiving, by the terminal device, phase configuration information sent by the network device; and determining, by the terminal device based on the phase configuration information, whether an adjacent transmission phase is continuous. The adjacent transmission phase is a phase between adjacent data channels, or a phase between adjacent pilots, or a phase between a data channel and a pilot that are adjacent. The network device may indicate, to the terminal device by using the phase configuration information, whether the adjacent transmission phase is continuous, so that the terminal device can determine, by using the phase configuration information, whether joint estimation can be performed.

In some embodiments, the reserved resource is a time-frequency resource that is reserved by the network device for another terminal device having a different device type from the terminal device.

In some embodiments, the method further includes: determining, by the terminal device based on the configuration information of the reserved resource, a frequency domain location of the reserved resource. In this embodiment, when the network device determines the resource type of the reserved resource, the network device may further determine the frequency domain location of the reserved resource, and the configuration information of the reserved resource that is generated by the network device may indicate both type information of the resource type and the frequency domain location of the reserved resource.

According to a third aspect, an embodiment provides a network device. The network device includes: a resource type determining module, configured to determine that a resource type of a reserved resource is a first-type reserved resource or a second-type reserved resource, where different resource types of the reserved resource are corresponding to different radio frequency processing manners of a terminal device; a configuration information generation module, configured to generate configuration information of the reserved resource, where the configuration information is used to indicate type information of the resource type; and a sending module, configured to send the configuration information of the reserved resource to the terminal device.

In some embodiments, the resource type determining module includes: a capability information receiving module, configured to receive capability information of the terminal device that is reported by the terminal device, where the capability information of the terminal device includes at least one of the following information: information about a quantity of radio frequency filters supported by the terminal device, information about a center frequency of a radio frequency filter, information about a bandwidth supported by a radio frequency filter, and information about whether the terminal device has a frequency domain windowing capability; and a first resource type determining submodule, configured to determine, based on the capability information of the terminal device, that the resource type of the reserved resource is the first-type reserved resource or the second-type reserved resource.

In some embodiments, the resource type determining module includes: an interference measurement information obtaining module, configured to obtain interference measurement information of the reserved resource; an interference intensity determining module, configured to determine, based on the interference measurement information, an interference intensity corresponding to the reserved resource; and a second resource type determining submodule, configured to determine, based on the interference intensity corresponding to the reserved resource, that the resource type of the reserved resource is the first-type reserved resource or the second-type reserved resource.

In some embodiments, the sending module is specifically configured to: send radio resource control RRC signaling to the terminal device; and when a state of a first information element IE in the RRC signaling is a first state, indicate the first-type reserved resource, or when a state of a first IE in the RRC signaling is a second state, indicate the second-type reserved resource.

In some embodiments, the sending module is specifically configured to: send downlink control information DCI to the terminal device; and when a state of a first field in the DCI is a third state, indicate the first-type reserved resource, or when a state of a first field in the DCI is a fourth state, indicate the second-type reserved resource.

In some embodiments, the first-type reserved resource includes a radio frequency RF-level reserved resource, and the second-type reserved resource includes a baseband BB-level reserved resource; or the first-type reserved resource includes a high interference-type reserved resource, and the second-type reserved resource includes a low interference-type reserved resource.

In some embodiments, the sending module is further configured to send configuration information for shutdown to the terminal device, where the configuration information for shutdown is used to indicate whether the network device performs a shutdown behavior.

In some embodiments, the sending module is further configured to send phase configuration information to the terminal device, where the phase configuration information is used to indicate whether an adjacent transmission phase is continuous.

In some embodiments, the reserved resource is a time-frequency resource that is reserved by the network device for another terminal device having a different device type from the terminal device.

In the third aspect of this application, composition modules of the network device may further perform the steps described in the first aspect and the possible implementations. For details, refer to the descriptions in the first aspect and the possible implementations.

According to a fourth aspect, an embodiment provides a terminal device, including: a receiving module, configured to receive configuration information of a reserved resource that is sent by a network device; a configuration information parsing module, configured to determine, based on the configuration information of the reserved resource, that a resource type of the reserved resource is a first-type reserved resource or a second-type reserved resource; and a radio frequency processing manner determining module, configured to determine a radio frequency processing manner on the reserved resource based on the resource type.

In a possible design of the fourth aspect of this application, the receiving module is specifically configured to receive radio resource control RRC signaling sent by the network device; and the configuration information parsing module is specifically configured to: parse a first information element IE in the RRC signaling; and when a state of the first IE is a first state, determine that the reserved resource is the first-type reserved resource, or when a state of the first IE is a second state, determine that the reserved resource is the second-type reserved resource.

In a possible design of the fourth aspect of this application, the receiving module is specifically configured to receive downlink control information DCI sent by the network device; and the configuration information parsing module is specifically configured to: parse a first field in the DCI; and when a state of the first field is a third state, determine that the reserved resource is the first-type reserved resource, or when a state of the first field is a fourth state, determine that the reserved resource is the second-type reserved resource.

In a possible design of the fourth aspect of this application, the first-type reserved resource includes a radio frequency RF-level reserved resource, and the second-type reserved resource includes a baseband BB-level reserved resource; or the first-type reserved resource includes a high interference-type reserved resource, and the second-type reserved resource includes a low interference-type reserved resource.

In a possible design of the fourth aspect of this application, the terminal device further includes a sending module, where the sending module is configured to: before the receiving module receives the configuration information of the reserved resource that is sent by the network device, report capability information of the terminal device to the network device.

In a possible design of the fourth aspect of this application, the receiving module is further configured to receive configuration information for shutdown sent by the network device; and the configuration information parsing module is further configured to determine, based on the configuration information for shutdown, whether the network device performs a shutdown behavior.

In a possible design of the fourth aspect of this application, the receiving module is further configured to receive phase configuration information sent by the network device; and the configuration information parsing module is further configured to determine, based on the phase configuration information, whether an adjacent transmission phase is continuous.

In a possible design of the fourth aspect of this application, the reserved resource is a time-frequency resource that is reserved by the network device for another terminal device having a different device type from the terminal device.

In the fourth aspect of this application, composition modules of the terminal device may further perform the steps described in the second aspect and the possible implementations. For details, refer to the descriptions in the second aspect and the possible implementations.

According to a fifth aspect, an embodiment further provides a terminal device. The terminal device includes a processor, a memory, a transmitter, and a receiver, where the receiver is configured to receive configuration information of a reserved resource that is sent by a network device;

the memory is configured to store data and instructions of the receiver and the processor; and the processor is configured to: determine, based on the configuration information of the reserved resource, that a resource type of the reserved resource is a first-type reserved resource or a second-type reserved resource; and determine a radio frequency processing manner on the reserved resource based on the resource type.

In a possible design of the fifth aspect of this application, the receiver is specifically configured to receive radio resource control RRC signaling sent by the network device; and the processor is specifically configured to: parse a first information element IE in the RRC signaling; and when a state of the first IE is a first state, determine that the reserved resource is the first-type reserved resource, or when a state of the first IE is a second state, determine that the reserved resource is the second-type reserved resource.

In a possible design of the fifth aspect of this application, the receiver is specifically configured to receive downlink control information DCI sent by the network device; and the processor is specifically configured to: parse a first field in the DCI; and when a state of the first field is a third state, determine that the reserved resource is the first-type reserved resource, or when a state of the first field is a fourth state, determine that the reserved resource is the second-type reserved resource.

In a possible design of the fifth aspect of this application, the first-type reserved resource stored in the memory includes a radio frequency RF-level reserved resource, and the second-type reserved resource includes a baseband BB-level reserved resource; or the first-type reserved resource includes a high interference-type reserved resource, and the second-type reserved resource includes a low interference-type reserved resource.

In a possible design of the fifth aspect of this application, the transmitter is configured to: before the receiver receives the configuration information of the reserved resource that is sent by the network device, report capability information of the terminal device to the network device.

In a possible design of the fifth aspect of this application, the capability information of the terminal device that is stored in the memory includes at least one of the following information: information about a quantity of radio frequency filters supported by the terminal device, information about a center frequency of a radio frequency filter, information about a bandwidth supported by a radio frequency filter, and information about whether the terminal device has a frequency domain windowing capability.

In a possible design of the fifth aspect of this application, the receiver is further configured to receive configuration information for shutdown sent by the network device; and the processor is further configured to determine, based on the configuration information for shutdown, whether the network device performs a shutdown behavior.

In a possible design of the fifth aspect of this application, the receiver is further configured to receive phase configuration information sent by the network device; and the processor is further configured to determine, based on the phase configuration information, whether an adjacent transmission phase is continuous.

In a possible design of the fifth aspect of this application, the reserved resource stored in the memory is a time-frequency resource that is reserved by the network device for another terminal device having a different device type from the terminal device.

According to a sixth aspect, an embodiment provides a communications apparatus. The communications apparatus may include an entity such as a terminal device or a chip, and the communications apparatus includes a processor and a memory. The memory is configured to store an instruction, and the processor is configured to execute the instruction in the memory, so that the communications apparatus performs the method in the first aspect or the second aspect.

According to a seventh aspect, an embodiment provides a computer readable storage medium, where the computer-readable storage medium stores an instruction, and when the instruction runs on a computer, the computer performs the method in the foregoing aspects.

According to an eighth aspect, an embodiment provides a computer program product including an instruction, where when the instruction runs on a computer, the computer performs the method in the foregoing aspects.

BRIEF DESCRIPTION OF DRAWINGS

FIG. 10-$a$ is a schematic structural diagram of composition of a network device according to an embodiment;

FIG. 10-*b* is a schematic structural diagram of composition of a resource type determining module according to an embodiment;

FIG. 10-*c* is a schematic structural diagram of composition of another resource type determining module according to an embodiment;

FIG. 11-*a* is a schematic structural diagram of composition of a terminal device according to an embodiment;

FIG. 11-*b* is a schematic structural diagram of composition of another terminal device according to an embodiment;

DESCRIPTION OF EMBODIMENTS

Embodiments provide an information processing method and a terminal device, so that a network device can indicate a reserved resource, and the terminal device can process the reserved resource.

The following describes various embodiments with reference to accompanying drawings.

As used herein, claims, and accompanying drawings of this application, the terms "first", "second", and the like are intended to distinguish similar objects but do not necessarily indicate a specific order or sequence. It should be understood that the terms used in such a way are interchangeable in proper circumstances, which is merely a discrimination manner that is used when objects having a same attribute are described in the Embodiments. In addition, the terms "include", "contain", and any other variants mean to cover the non-exclusive inclusion, so that a process, method, system, product, or device that includes a series of units is not necessarily limited to those units, but may include other units not expressly listed or inherent to such a process, method, product, or device.

The technology described in this application may be applied to a long term evolution (Long Term Evolution, LTE for short) system or another wireless communications system using various radio access technologies, for example, a system using an access technology such as code division multiple access, frequency division multiple access, time division multiple access, orthogonal frequency division multiple access, or single carrier frequency division multiple access. In addition, the technology may be further applied to a subsequent evolved system of the LTE system such as a fifth-generation 5G (the fifth generation, 5G) system, which includes a new radio (New Radio, NR) system, an evolved LTE (evolved LTE) system, and the like.

Figure 1:
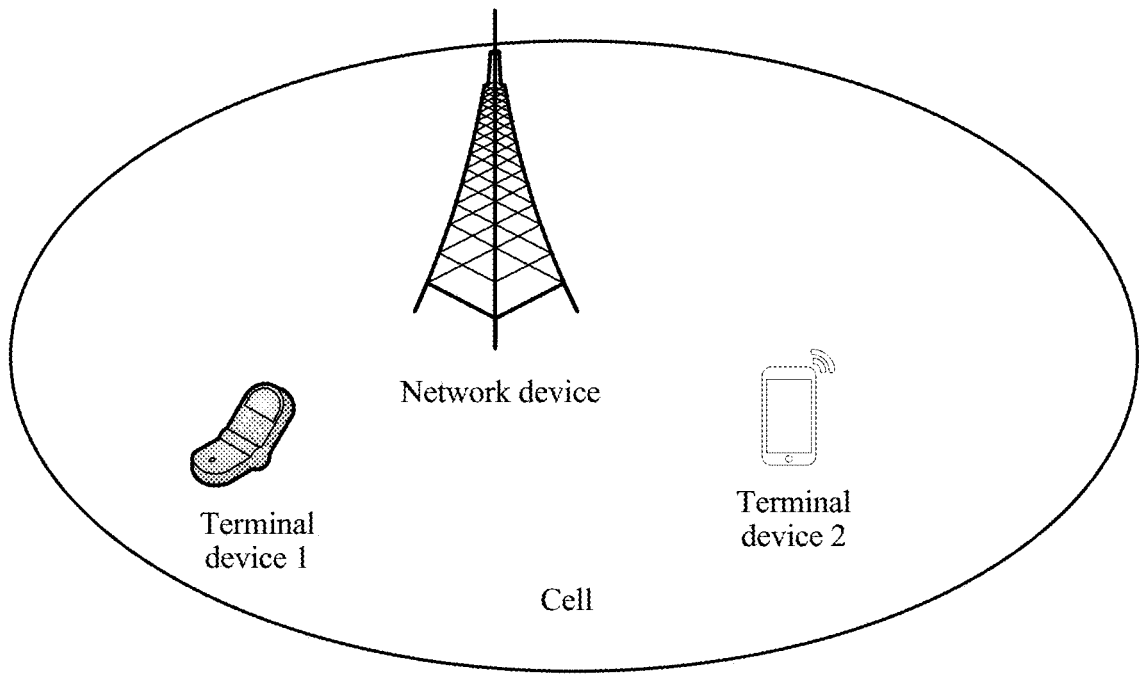
FIG. 1 is a schematic diagram of example possible system network according to this application.

FIG. 1 is a schematic structural diagram of composition of a system according to an embodiment. The system may include a network device and a terminal device, and there may be one or more terminal devices. The terminal device mentioned in this application includes various handheld devices, in-vehicle devices, wearable devices, or computing devices that have a wireless communication function, or other processing devices connected to a wireless modem, and various forms of user equipments (UE), mobile stations (MS), terminals, terminal devices, and the like. For ease of description, in this application, the devices mentioned above are collectively referred to as user equipment or UE. The network device mentioned in this application may include a base station (BS for short), and the network device is an apparatus deployed in a radio access network to provide a wireless communication function for the UE. The base station may include various forms of macro base stations, micro base stations, relay stations, access points, and the like. In systems using different radio access technologies, a device having a base station function may have different names. For example, the device is referred to as an evolved NodeB (eNB or eNodeB for short) in an LTE system, the device is referred to as a gNB in an NR system, the device is referred to as a NodeB in a third-generation 3G system, and the like.

The NR system is used as an example. In consideration of forward compatibility, some blank resources (blank resource) are reserved in the NR system, the blank resource is also referred to as a reserved resource (reserved resource), and the reserved resource includes a time domain resource and a frequency domain resource. The time domain resource may use a symbol, a slot, a system frame as a time unit, and the frequency domain resource may use a physical resource block (PRB), a subcarrier, a bandwidth part (BP), and the like as a frequency unit. In the NR system, the network device may indicate the reserved resource by using explicit signaling. The reserved resource may occupy a full bandwidth or a partial bandwidth in frequency domain, and may occupy one or more symbols in time domain.

For another example, in an application scenario in which LTE and NR coexist, because an LTE base station needs to send a cell reference signal (CRS) on some symbols, the NR system may use a resource for sending the CRS as the reserved resource.

In the NR system, for the reserved resource, if there is no information on some symbols that is to be sent by the network device, to achieve power saving and energy saving, the network device may perform a shutdown behavior on these symbols. The shutdown behavior means that when there is no data on some time domain symbols that needs to be sent by a base station, the network device shuts down a power amplifier on these symbols, so as to reduce system power consumption. A smaller cell service load contributes to better power saving.

Figure 2:
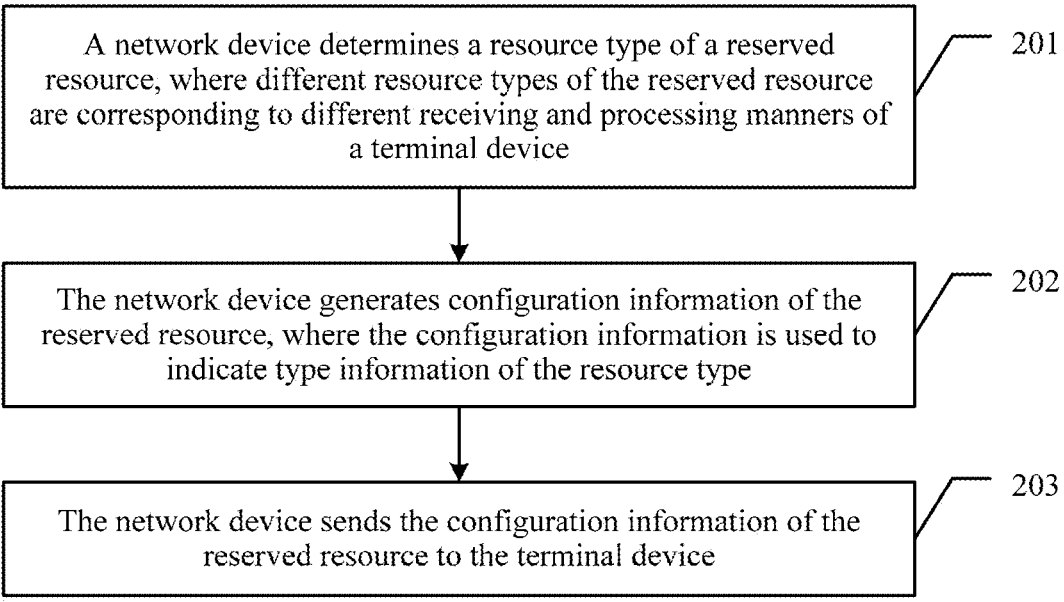
FIG. 2 is a schematic block flowchart of an information indication method according to an embodiment.

Based on the description of the reserved resource in the NR system in the foregoing embodiment, the following describes a manner of indicating the reserved resource separately from perspectives of a network device and a terminal device. First, a description is provided from a perspective of the network device. Referring to FIG. 2, in an embodiment of an information indication method in this application, the method may include the following steps.

201. The network device determines a resource type of a reserved resource, where different resource types of the reserved resource are corresponding to different receiving and processing manners of a terminal device.

In this embodiment, the network device may be an NR base station in an NR system. When the reserved resource is determined in consideration of forward compatibility in the NR system, the network device needs to first determine the resource type of the reserved resource. The different resource types of the reserved resource are corresponding to the different receiving and processing manners of the terminal device, in other words, the resource type of the reserved resource is used to indicate a specific receiving and processing manner to the terminal device. For example, if the reserved resource has at least two resource types, the reserved resource of each type may indicate one receiving and processing manner of the terminal device, so that when the terminal device determines the resource type of the reserved resource that is indicated by the network device, the terminal device can determine a receiving and processing manner that needs to be used.

In one embodiment, the reserved resource may be a time-frequency resource that is reserved by the network device for another terminal device having a different device type from the terminal device. In a scenario shown in FIG. 1, the network device may be configured to provide a communication service for a plurality of terminal devices. For example, the plurality of terminal devices may include a terminal device 1 and a terminal device 2. For the terminal device 1, the reserved resource may be a time-frequency resource that is reserved for the terminal device 2 and that the network device does not allow the terminal device 1 to use. For the terminal device 2, the reserved resource may be a time-frequency resource that is reserved for the terminal device 1 and that the network device does not allow the terminal device 2 to use.

In one embodiment, different resource types of the reserved resource are corresponding to different radio frequency processing manners of the terminal device. The terminal device may use the different radio frequency processing manners for the different resource types indicated by the network device. For example, the terminal device determines that quantities of radio frequency filters used for the different resource types are different, or the terminal device determines whether to perform radio frequency receiving at a specific frequency or some frequencies for the different resource types, or bandwidths of radio frequency filters used by the terminal device are different.

In one embodiment, that the network device determines a resource type of a reserved resource in step 203 includes the following step:

A1. The network device determines that the resource type of the reserved resource is a first-type reserved resource or a second-type reserved resource.

The resource type of the reserved resource includes at least the first-type reserved resource or the second-type reserved resource. For example, the network device first determines that the resource type of the reserved resource is the first-type reserved resource. For another example, the network device first determines that the resource type of the reserved resource is the second-type reserved resource. The first-type reserved resource and the second-type reserved resource are merely specific manners used to distinguish different resource types of the reserved resource. Resource type content of the first-type reserved resource and resource type content of the second-type reserved resource may be represented in a plurality of manners.

Figure 3:
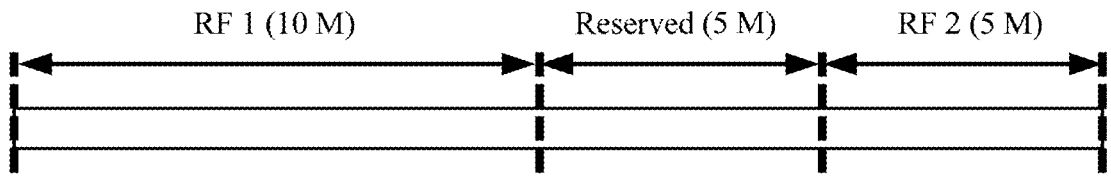
FIG. 3 is a schematic diagram of an RF-level reserved resource according to an embodiment.
Figure 4:
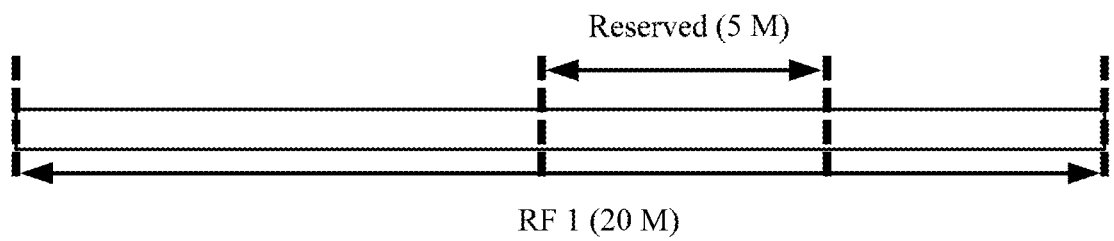
FIG. 4 is a schematic diagram of a BB-level reserved resource according to an embodiment.

In one embodiment, the first-type reserved resource includes a radio frequency (RF)-level reserved resource, and the second-type reserved resource includes a baseband (BB)-level reserved resource. The RF-level reserved resource indicated by the network device indicates a reserved resource that is set between adjacent radio frequency bands and on which the terminal device receives or sends data in respective radio frequency bands of a plurality of radio frequency filters. Examples are as follows: FIG. 3 is a schematic diagram of an RF-level reserved resource, and indicates that the UE supports both two RF-level filters with bandwidths of 10 MHz and 5 MHz. The UE may separately receive/send data on frequency bands of an RF 1 and an RF 2, but does not receive/send data on a reserved frequency band of 5 MHz, and the reserved frequency band of 5 MHz is the reserved resource. Specifically, for the radio frequency-level reserved resource, the UE needs to have a relatively strong UE capability, in other words, the UE needs to have more radio frequency filters and radio frequency filters with a larger bandwidth. The BB-level reserved resource indicated by the network device indicates a reserved resource on which the terminal device receives data on a full frequency band when only one radio frequency filter is supported, but does not perform baseband processing on some frequency bands. FIG. 4 is a schematic diagram of a BB-level reserved resource, and indicates that the UE supports only an RF-level filter with a bandwidth of 20 MHz. The UE receives data on the entire bandwidth of 20 MHz, but does not perform baseband processing on a reserved frequency domain resource of 5 MHz. When the UE has a relatively weak capability, in other words, a bandwidth range of a radio frequency filter is not wide enough, a base station configures the BB-level reserved resource.

In another embodiment, the first-type reserved resource includes a high interference-type reserved resource, and the second-type reserved resource includes a low interference-type reserved resource. The network device may obtain interference measurement information of the reserved resource, and set an interference intensity threshold, to determine that an interference type of the reserved resource is a high interference type or a low interference type.

In one embodiment, that the network device determines that the resource type of the reserved resource is a first-type reserved resource or a second-type reserved resource in step A1 includes the following steps:

A11. The network device receives capability information of the terminal device that is reported by the terminal device.

A12. The network device determines, based on the capability information of the terminal device, that the resource type of the reserved resource is the first-type reserved resource or the second-type reserved resource.

The terminal device may report the capability information of the terminal device to the network device by using a wireless network. The network device receives the capability information of the terminal device, the network device parses the capability information to determine a terminal capability of the terminal device, and the network device determines, based on the terminal capability of the terminal device, a resource type that matches the terminal capability. In some embodiments, the network device may determine, based on the terminal capability of the terminal device, that a resource type that matches the terminal device is the first-type reserved resource, or the network device may determine, based on the terminal capability of the terminal device, that a resource type that matches the terminal device is the second-type reserved resource. For detailed descriptions of the first-type reserved resource and the second-type reserved resource, refer to the descriptions in the foregoing embodiment.

Further, in one embodiment, the capability information of the terminal device includes at least one of the following information: information about a quantity of radio frequency filters supported by the terminal device, information about a center frequency of a radio frequency filter, information about a bandwidth supported by a radio frequency filter, and information about whether the terminal device has a frequency domain windowing capability.

A specific type of the capability information that needs to be reported by the terminal device to the network device may be indicated by the network device to the terminal device, or the terminal device may report the capability information of the terminal device based on a capability type configured by default. For example, the UE may report a UE capability of the UE to the base station, for example, information such as a bandwidth and a center frequency of a radio frequency filter that can be supported by the UE. The information about the quantity of radio frequency filters supported by the terminal device may be one radio frequency filter, or may be a plurality of radio frequency filters. The information about the center frequency of the radio frequency filter may be a location of the center frequency and a quantity of center frequencies. The information about the bandwidth supported by the radio frequency filter may be a specific bandwidth range, or may be a maximum supported bandwidth threshold. The information about whether the terminal device has the frequency domain windowing capability may be that the terminal device has the frequency domain windowing capability, or may be that the terminal device does not have the frequency domain windowing capability. Content of a terminal capability reported by each terminal device is flexibly reported based on a terminal status of each terminal device. An example is merely used for description herein.

In another embodiment, that the network device determines that the resource type of the reserved resource is a first-type reserved resource or a second-type reserved resource in step A1 includes the following steps:

A13. The network device obtains interference measurement information of the reserved resource.

A14. The network device determines, based on the interference measurement information, an interference intensity corresponding to the reserved resource.

A15. The network device determines, based on the interference intensity corresponding to the reserved resource, that the resource type of the reserved resource is the first-type reserved resource or the second-type reserved resource.

The network device may obtain the interference measurement information of the reserved resource. The interference measurement information obtained by the network device may be obtained in an uplink interference measurement process, or may be obtained in a downlink interference measurement process. A detailed interference measurement process is not limited herein. After the network device obtains the interference measurement information, the network device may set the interference intensity threshold, to determine the interference intensity corresponding to the reserved resource, so as to determine, by using a level of the interference intensity, that the interference type of the reserved resource is the high interference type or the low interference type.

202. The network device generates configuration information of the reserved resource, where the configuration information is used to indicate type information of the resource type.

In this embodiment, after the network device determines the type information of the resource type, the network device may generate the configuration information of the reserved resource based on the determined resource type of the reserved resource, and the configuration information carries the type information of the resource type of the reserved resource. The network device generates the configuration information of the reserved resource in a plurality of manners. The network device may generate the configuration information of the reserved resource by using a plurality of types of signaling, provided that the signaling can be identified by the terminal device.

In one embodiment, in addition to the foregoing steps, the information indication method provided in this embodiment may further include the following step:

B1. The network device determines a frequency domain location of the reserved resource.

In this example implementation, the configuration information of the reserved resource is further used to indicate the frequency domain location of the reserved resource.

When the network device determines the resource type of the reserved resource, the network device may further determine the frequency domain location of the reserved resource, and the configuration information of the reserved resource that is generated by the network device in step 202 may indicate both the type information of the resource type and the frequency domain location of the reserved resource.

203. The network device sends the configuration information of the reserved resource to the terminal device.

In this embodiment, after the network device generates the configuration information of the reserved resource, the network device may indicate the configuration information to the terminal device. The network device indicates the configuration information of the reserved resource in a plurality of manners. The following uses an example for description.

In one embodiment, that the network device sends the configuration information of the reserved resource to the terminal device in step 203 includes the following step:

C1. The network device sends radio resource control (Radio Resource Control, RRC) signaling to the terminal device, and when a state of a first information element (Information Element, IE) in the RRC signaling is a first state, indicates the first-type reserved resource, or when a state of a first IE in the RRC signaling is a second state, indicates the second-type reserved resource.

The network device may indicate the configuration information of the reserved resource by using the RRC signaling. For example, the network device configures the first IE in the RRC signaling, and the first IE has a plurality of states. For example, the first IE may include the first state and the second state, and different states may indicate different types of reserved resources. The first IE may occupy one bit (bit). For example, the first state is 1, and the second state is 0. Optionally, the first IE may alternatively occupy two or more symbols. This is not limited herein.

In one embodiment, that the network device sends the configuration information of the reserved resource to the terminal device in step 203 includes the following step:

D1. The network device sends downlink control information (DCI) to the terminal device, and when a state of a first field in the DCI is a third state, indicates the first-type reserved resource, or when a state of a first field in the DCI is a fourth state, indicates the second-type reserved resource.

The network device may indicate the configuration information of the reserved resource by using the DCI. For example, the network device configures the first field in the DCI, and the first field has a plurality of states. For example, the first field may include the third state and the fourth state, and different states may indicate different types of reserved resources. The first field may occupy one bit. For example, the third state is 1, and the fourth state is 0. Optionally, the first field may alternatively occupy two or more bits. This is not limited herein.

In one embodiment, that the network device sends the configuration information of the reserved resource to the terminal device in step 203 includes the following step:

E1. The network device sends the configuration information of the reserved resource to the terminal device by using a system message, where the system message may include a master information block (MIB), remaining minimum system information (RMSI), or other system information (SI).

The system message is a MIB in an LTE system, and may be a MIB, RMSI, or other (other) SI in the NR system. System information is specific configuration information of a cell, and is valid for all UEs that access to the cell, in other words, the system information is cell-level information. The system information may include information such as a system bandwidth, a working mode of the cell (for example, frequency division multiplexing (FDD)/time division multiplexing (TDD)), a location of a common control area of the cell, and a quantity of cell-specific antenna ports. The system information may further include the configuration information of the reserved resource in this embodiment.

In one embodiment, in addition to the foregoing steps, the information indication method provided in this embodiment may further include the following step:

F1. The network device sends configuration information for shutdown to the terminal device, where the configuration information for shutdown is used to indicate whether the network device performs a shutdown behavior.

In the NR system, for the reserved resource, if there is no information on some symbols that is to be sent by the network device, to achieve power saving and energy saving, the network device may perform a shutdown behavior on these symbols. The shutdown behavior means that when there is no data on some time domain symbols that needs to be sent by the base station, the network device shuts down a power amplifier on these symbols, so as to reduce system power consumption. A smaller cell service load contributes to better power saving. The network device may indicate, to the terminal device by using the configuration information for shutdown, whether the network device performs the shutdown behavior.

In one embodiment, in addition to the foregoing steps, the information indication method provided in this embodiment may further include the following step:

G1. The network device sends phase configuration information to the terminal device, where the phase configuration information is used to indicate whether an adjacent transmission phase is continuous.

The adjacent transmission phase is a phase between adjacent data channels, or a phase between adjacent pilots, or a phase between a data channel and a pilot that are adjacent. The network device may indicate, to the terminal device by using the phase configuration information, whether the adjacent transmission phase is continuous.

It can be learned from the present disclosure, in this embodiment, the network device may configure the resource type of the reserved resource, and the network device sends the configuration information of the reserved resource to the terminal device, so that the network device can indicate the type of the reserved resource to the terminal device, and the terminal device can parse the configuration information of the reserved resource, to determine a receiving and processing manner used by the terminal device. In this embodiment, the network device may indicate the resource type of the reserved resource by using the configuration information of the reserved resource, so as to implement processing manners of the network device and the terminal device for the reserved resource.

Figure 5:
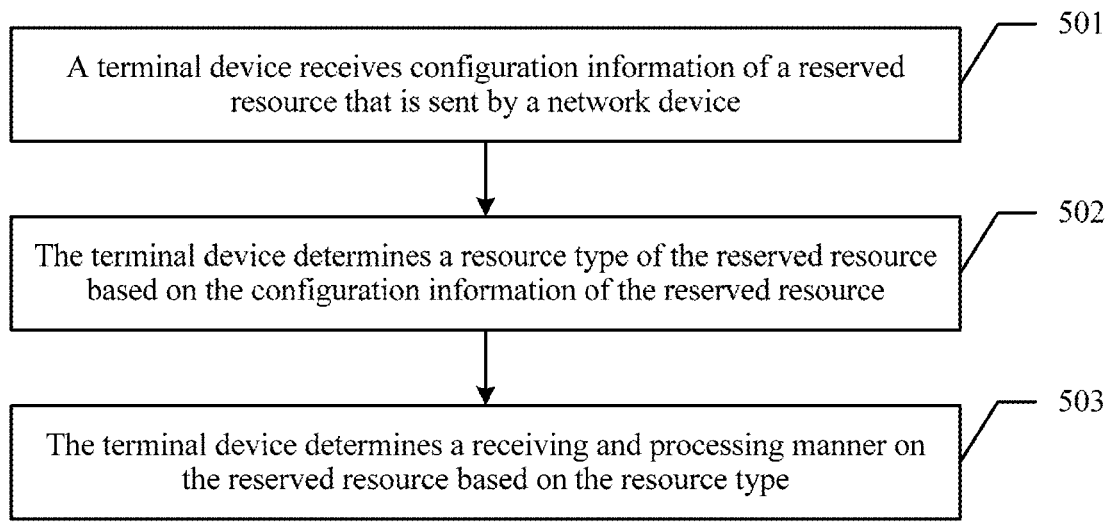
FIG. 5 is a schematic block flowchart of an information processing method according to an embodiment.

In the foregoing embodiment, the information indication method according to the embodiments is described from a perspective of the network device. The following describes an information processing method from a perspective of a terminal device. FIG. 5 shows an embodiment of the information indication method in this application, and the method may include the following steps.

501. The terminal device receives configuration information of a reserved resource that is sent by a network device.

In this embodiment, the terminal device may be UE in an NR system. It may be learned from the foregoing embodiment that the network device sends the configuration information of the reserved resource to the terminal device, and the terminal device may receive the configuration information. A specific receiving manner used by the terminal device may be determined in advance with the network device, so that the terminal device can complete communication with the network device.

In one embodiment, that the terminal device receives configuration information of a reserved resource that is sent by a network device in step 501 includes the following step:

H1. The terminal device receives RRC signaling sent by the network device.

In another embodiment, that the terminal device receives configuration information of a reserved resource that is sent by a network device includes the following step:

I1. The terminal device receives DCI sent by the network device.

In one embodiment, that the terminal device receives configuration information of a reserved resource that is sent by a network device in step 501 includes the following step:

J1. The terminal device receives a system message sent by the network device, where the system message may include a master information block MIB, remaining minimum system information RMSI, or another system information block SIB.

502. The terminal device determines a resource type of the reserved resource based on the configuration information of the reserved resource.

In this embodiment, the network device indicates the resource type of the reserved resource by using the configuration information of the reserved resource. After receiving the configuration information of the reserved resource, the terminal device parses the configuration information, to determine the resource type of the reserved resource. The resource type may include a first-type reserved resource or a second-type reserved resource. For details, refer to the detailed description of the resource type of the reserved resource on a network device side in the foregoing embodiment.

For example, a receiving and processing process of the UE may be summarized as radio frequency filter receiving and baseband processing. For the reserved resource, from a perspective of frequency domain, an interference signal with relatively large energy may exist on some frequency bands. If interference is relatively strong, in the reserved resource part, the UE needs to perform filtering processing on the frequency band to some extent, in other words, to disable receiving at a radio frequency end on the frequency band. On the contrary, if interference is relatively weak, the UE may still receive data by using a full-bandwidth radio frequency receiver, but does not perform baseband processing on a frequency band of the reserved resource.

For the foregoing reason, from a perspective of frequency domain of the reserved resource, the reserved resource may be divided into a radio frequency-level reserved resource and a baseband-level reserved resource. First, for the radio frequency-level reserved resource, as shown in FIG. 3, the UE supports both two RF-level filters with bandwidths of 10 MHz and 5 MHz. The UE may separately receive/send data on frequency bands of an RF 1 and an RF 2, but does not receive/send data on a reserved frequency band of 5 MHz. Specifically, for the radio frequency-level reserved resource, the UE needs to have a relatively strong UE capability. The following describes the baseband-level reserved resource by using an example. As shown in FIG. 4, the UE supports only an RF-level filter with a bandwidth of 20 MHz. The UE receives data on the entire bandwidth of 20 MHz, but does not perform baseband processing on a reserved frequency domain resource of 5 MHz. When the UE has a relatively weak capability, in other words, a bandwidth range of a radio frequency filter is not wide enough, a base station configures the BB-level reserved resource.

In the foregoing implementation scenario of performing step H1, that the terminal device determines a resource type of the reserved resource based on the configuration information of the reserved resource in step 502 includes the following step:

K1. The terminal device parses a first information element IE in the RRC signaling, and when a state of the first IE is a first state, determines that the reserved resource is a first-type reserved resource, or when a state of the first IE is a second state, the terminal device determines that the reserved resource is a second-type reserved resource.

The network device may indicate the configuration information of the reserved resource by using the RRC signaling. For example, the network device configures the first IE in the RRC signaling, and the first IE has a plurality of states. For example, the first IE may include the first state and the second state, and different states may indicate different types of reserved resources. The first IE may occupy one bit. For example, the first state is 1, and the second state is 0. In some embodiments, the first IE may alternatively occupy two or more bits. This is not limited herein.

In the foregoing implementation scenario of performing step I1, that the terminal device determines a resource type of the reserved resource based on the configuration information of the reserved resource in step 502 includes the following step:

L1. The terminal device parses a first field in the DCI, and when a state of the first field is a third state, determines that the reserved resource is a first-type reserved resource, or when a state of the first field is a fourth state, determines that the reserved resource is a second-type reserved resource.

The network device may indicate the configuration information of the reserved resource by using the DCI. For example, the network device configures the first field in the DCI, and the first field has a plurality of states. For example, the first field may include the third state and the fourth state, and different states may indicate different types of reserved resources. The first field may occupy one bit. For example, the third state is 1, and the fourth state is 0. Optionally, the first field may alternatively occupy two or more bits. This is not limited herein.

In the foregoing implementation scenario of performing step J1, that the terminal device determines a resource type of the reserved resource based on the configuration information of the reserved resource in step 502 includes the following step:

M1. The terminal device parses the system message, to obtain the configuration information of the reserved resource.

The system message sent by the network device may include the MIB, the RMSI, or the other system information.

503. The terminal device determines a receiving and processing manner on the reserved resource based on the resource type.

In this embodiment, different resource types of the reserved resource are corresponding to different receiving and processing manners of the terminal device, in other words, the resource type of the reserved resource is used to indicate a specific receiving and processing manner to the terminal device. For example, if the reserved resource has at least two resource types, the reserved resource of each type may indicate one receiving and processing manner of the terminal device, so that when the terminal device determines the resource type of the reserved resource that is indicated by the network device, the terminal device can determine a receiving and processing manner that needs to be used.

In a possible design of this embodiment, the reserved resource may be a time-frequency resource that is reserved by the network device for another terminal device having a different device type from the terminal device. In a scenario shown in FIG. 1, the network device may be configured to provide a communication service for a plurality of terminal devices. For example, the plurality of terminal devices may include a terminal device 1 and a terminal device 2. For the terminal device 1, the reserved resource may be a time-frequency resource that is reserved for the terminal device 2 and that the network device does not allow the terminal device 1 to use. For the terminal device 2, the reserved resource may be a time-frequency resource that is reserved for the terminal device 1 and that the network device does not allow the terminal device 2 to use.

In one embodiment, different resource types of the reserved resource are corresponding to different radio frequency processing manners of the terminal device. The terminal device may use the different radio frequency processing manners for the different resource types indicated by the network device. For example, the terminal device determines that quantities of radio frequency filters used for the different resource types are different, or the terminal device determines whether to perform radio frequency receiving at a specific frequency or some frequencies for the different resource types, or bandwidths of radio frequency filters used by the terminal device are different.

In one embodiment, before the terminal device receives the configuration information of the reserved resource that is sent by the network device in step 501, the information processing method provided in this embodiment further includes the following step:

N1. The terminal device reports capability information of the terminal device to the network device.

In one embodiment, in addition to the foregoing steps, the information processing method provided in this embodiment may further include the following steps:

O1. The terminal device receives configuration information for shutdown sent by the network device.

O2. The terminal device determines, based on the configuration information for shutdown, whether the network device performs a shutdown behavior.

In one embodiment, in addition to the foregoing steps, the information processing method provided in this embodiment may further include the following steps:

P1. The terminal device receives phase configuration information sent by the network device.

P2. The terminal device determines, based on the phase configuration information, whether an adjacent transmission phase is continuous.

In one embodiment, in addition to the foregoing steps, the information processing method provided in this embodiment may further include the following step:

Q1. The terminal device determines, based on the configuration information of the reserved resource, a frequency domain location of the reserved resource.

It can be learned from the present disclosure that the terminal device may receive the configuration information of the reserved resource that is sent by the network device, and then the terminal device parses the configuration information of the reserved resource, to determine a receiving and processing manner used by the terminal device. In this embodiment, the network device may indicate the resource type of the reserved resource by using the configuration information of the reserved resource, so as to implement processing manners of the network device and the terminal device for the reserved resource.

To better understand and implement the foregoing solutions in the Embodiments, the following uses a corresponding application scenario as an example for detailed description.

Network elements in accordance with the disclosure are a gNB (namely, a base station) and UE. A receiving and processing process of the UE may be summarized as radio frequency filter receiving and baseband processing. For a reserved resource, from a perspective of frequency domain, an interference signal with relatively large energy may exist on some frequency bands. If interference is relatively strong, in the reserved resource part, the UE needs to perform filtering processing on the frequency band to some extent, in other words, to disable receiving at a radio frequency end on the frequency band, and processes a radio frequency receiving filter. On the contrary, if interference is relatively weak, the UE may still receive data by using a full-bandwidth radio frequency receiver, but does not perform baseband processing on a frequency band of the reserved resource. For the foregoing reason, from a perspective of frequency domain of the reserved resource, the reserved resource may be divided into a radio frequency-level reserved resource and a baseband-level reserved resource.

For the reserved resource, a specific receiving/sending operation when the UE performs RF-level reservation is different from a specific receiving/sending operation when the UE performs BB-level reservation. In this embodiment, the base station configures a frequency domain characteristic of the reserved resource as the RF-level reservation or the BB-level reservation, and then the base station indicates the frequency domain characteristic of the reserved resource to the UE. For example, the base station indicates, by using a semi-static indication, that the reserved resource is the BB-level reservation or the RF-level reservation, or the base station indicates, to the UE, whether the reserved resource encounters high-energy interference. The base station configures the reserved resource as the RF-level reserved resource or the BB-level reserved resource based on a UE capability of the UE that is reported by the UE.

Figure 6:
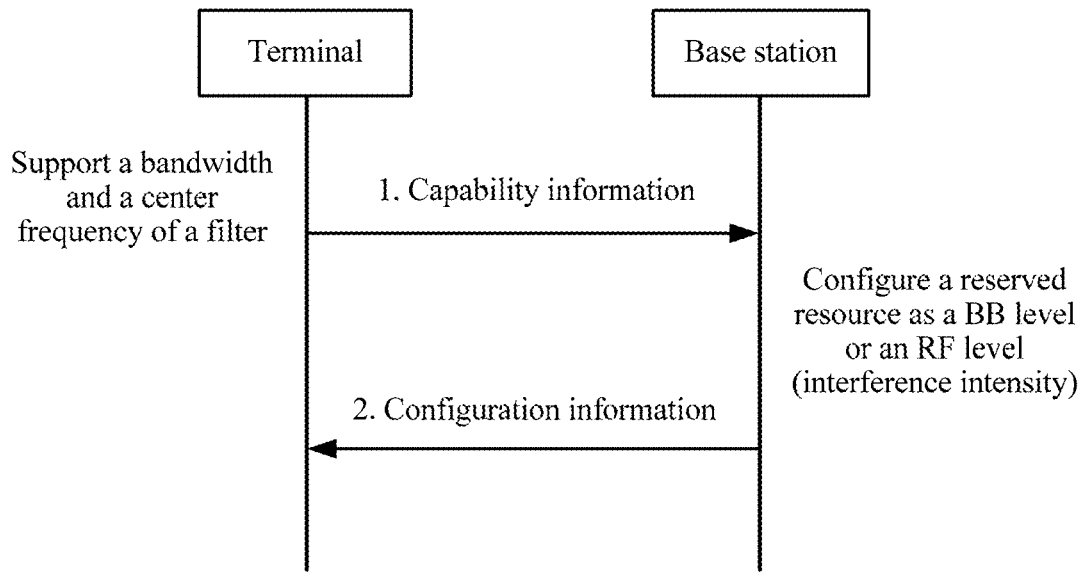
FIG. 6 is a schematic diagram of an interaction procedure between a terminal and a base station according to an embodiment.

In an embodiment, the base station sends configuration information of the reserved resource in frequency domain to the UE. In addition to a frequency domain location of the resource, the base station needs to indicate, to the UE, whether the reserved resource is the RF-level reservation or the BB-level reservation, and manners of receiving and processing reserved resources of different levels by the UE are different. The base station configures and indicates the reserved resource based on the UE capability of the UE that is reported by the UE, for example, information such as a bandwidth and a center frequency of a radio frequency filter that can be supported by the UE. As shown in FIG. 6, a specific process is as follows:

The base station configures and indicates the reserved resource in frequency domain by using RRC higher layer signaling/DCI for RF-level processing or BB-level processing.

The base station semi-statically configures the UE by using a newly added RRC information element.

For example, as shown in Table 1, an RRC IE may configure the UE for RF-level processing or BB-level processing.

| New IE in RRC (1 bit) | Meaning |
| --- | --- |
| 1 | RF-level reservation (high interference) |
| 0 | BB-level reservation (low interference) |

Before the base station configures the frequency domain characteristic of the reserved resource, the UE reports capability information of the UE. The capability information of the UE includes but is not limited to information such as a bandwidth and a center frequency of a radio frequency filter.

In the example process shown in FIG. 6, the UE receives and processes the configuration information. For example, if the reserved resource is the RF-level reserved resource (high interference), the UE disables radio frequency-level receiving on a frequency band of the reserved resource. If the reserved resource is the BB-level reserved resource (low interference), the UE performs radio frequency-level receiving on a full bandwidth, but does not perform baseband processing on a frequency band of the configured reserved resource.

The base station indicates, by using a semi-static or dynamic indication, that the reserved resource is the BB-level reservation or the RF-level reservation (or indicates whether the reserved resource encounters high-energy interference). The base station configures, based on the UE capability of the UE that is reported by the UE, the reserved resource as the RF-level reserved resource or the BB-level reserved resource. For the reserved resource, a specific receiving/sending operation when the UE performs RF-level reservation is different from a specific receiving/sending operation when the UE performs BB-level reservation. There is no related indication information in the prior art. In addition, the base station needs to configure the frequency domain characteristic of the reserved resource based on the capability information of the UE that is reported by the UE. No related information is reported in the prior art. For the foregoing problem, a design solution of the indication information is provided in this embodiment.

In some Embodiments, the base station sends the configuration information to the UE that may also include another RRC message, namely, information for indicating a symbol shutdown behavior and indicating whether a phase is continuous.

Figure 7:
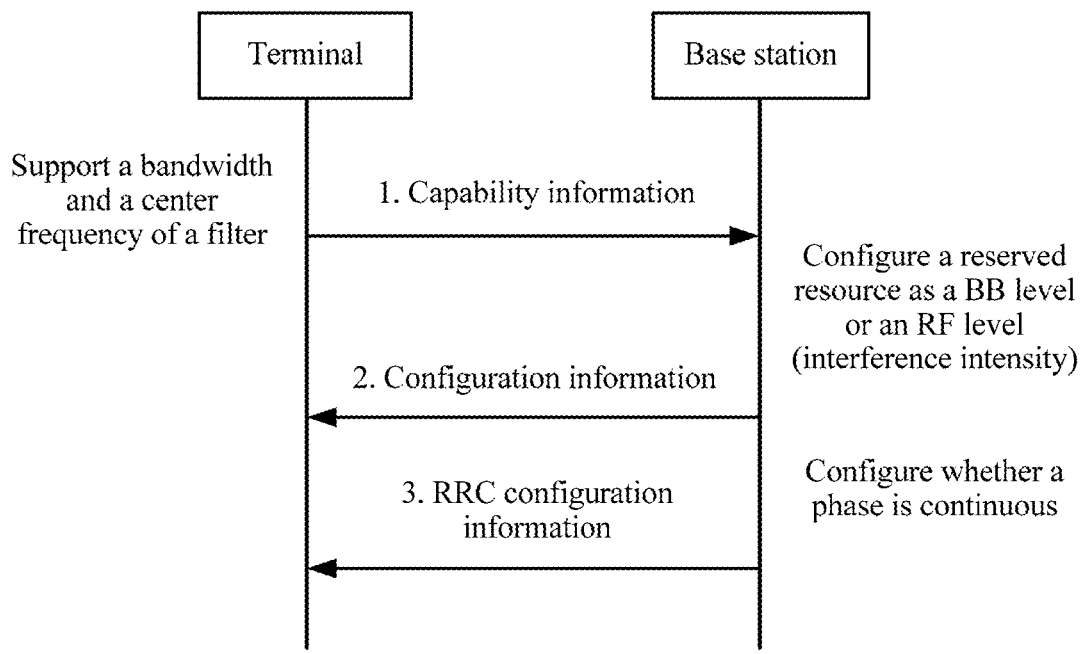
FIG. 7 is another schematic diagram of an interaction procedure between a terminal and a base station according to an embodiment.

For example, based on the foregoing procedure in this embodiment, referring to FIG. 7, the following procedure is added.

The base station indicates, by using RRC higher layer signaling, whether an adjacent transmission phase is continuous.

The base station semi-statically indicates, to the UE by using newly added RRC signaling, whether the adjacent transmission phase is continuous.

For example, as shown in Table 2, an RRC IE indicates, to the UE, whether the adjacent transmission phase is continuous.

| New IE in RRC (1 bit) | Meaning |
| --- | --- |
| 1 | The phase is continuous |
| 0 | The phase is discontinuous |

The RRC signaling sent by the base station may be UE-specific, or may be cell-specific. This is not limited in this application. In FIG. 7, after a terminal receives another piece of configuration information, the terminal may perform the following specific behavior. For example, if the phase is continuous, the UE may perform joint channel estimation or pilot reusing. If the phase is discontinuous, the UE still performs only channel estimation.

Figure 8:
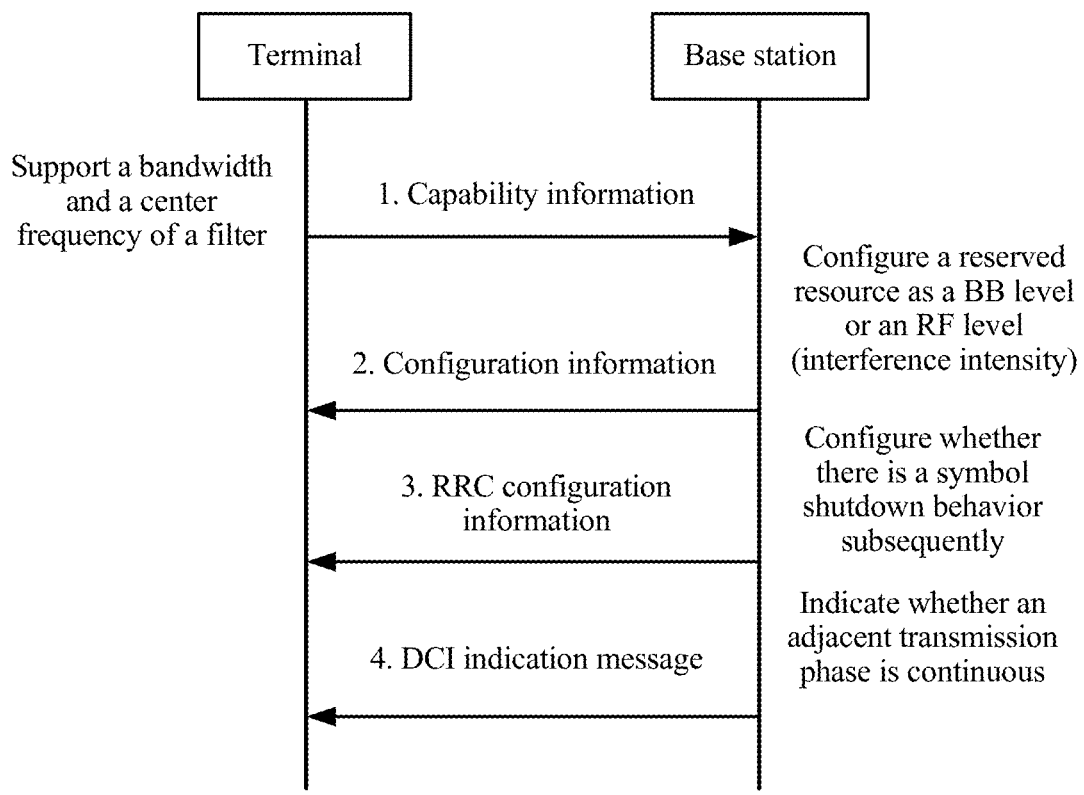
FIG. 8 is another schematic diagram of an interaction procedure between a terminal and a base station according to an embodiment.

Further, as shown in FIG. 8, based on the foregoing procedure in this embodiment, the following procedure is added.

The base station indicates, to the UE, whether there is a symbol shutdown behavior subsequently.

The base station indicates, to the UE by using newly added RRC signaling, whether there is the symbol shutdown behavior.

For example, as shown in Table 3, an RRC IE indicates, to the UE, whether there is a shutdown behavior subsequently.

| New IE in RRC (1 bit) | Meaning |
|---|---|
| 1 | There is a symbol shutdown behavior on the reserved resource |
| 0 | There is no symbol shutdown behavior on the reserved resource |

When the base station indicates, to the UE, that there is the symbol shutdown behavior subsequently, for example, when the base station configures a value of the IE as 1, the UE listens to related DCI.

The base station dynamically indicates, to the UE, whether the phase is continuous. For example, one field is newly added to the DCI, and indicates, to the UE by using the DCI, whether the adjacent transmission phase is continuous. The field newly added to the DCI may include a 1-bit field.

As shown in Table 4, a DCI field indicates, to the UE, whether the adjacent transmission phase is continuous.

| New field in DCI (1 bit) | Meaning |
|---|---|
| 1 | The adjacent transmission phase is continuous |
| 0 | The adjacent transmission phase is discontinuous |

In FIG. 8, after the terminal receives a DCI indication message, the terminal may perform the following specific behavior. For example, if the phase is continuous, the UE may perform joint channel estimation or pilot reusing. If the phase is discontinuous, the UE still performs only channel estimation.

During channel estimation in an LTE system, LTE uplink transmission is used as an example. The terminal sends a pilot signal on an uplink physical channel, and the base station performs channel estimation on the uplink physical channel based on the pilot signal. A typical channel estimation algorithm may be least square (LS) algorithm estimation or minimum mean square error (MMSE) algorithm estimation.

The LTE uplink transmission is used as an example, and a DMRS reference signal (pilot) is mainly used by an eNB to perform channel estimation on an uplink physical channel. For channel estimation on a PUSCH, in a case of a normal cyclic prefix (normal CP Cyclic Prefix), the DMRS is on a fourth symbol of each slot. For example, there are DMRSs on two symbols in one subframe of the LTE system.

To increase a demodulation success rate, improve transmission reliability, and reduce overheads of the pilot signal, a manner of joint channel estimation or pilot reusing may be used in actual application.

First, the joint channel estimation is described. To improve channel estimation accuracy in LTE, from a perspective of algorithm implementation, a joint channel estimation method may be used, to be specific, a duration unit for the channel estimation is extended to duration of two (2 ms) or more subframes.

Figure 9:
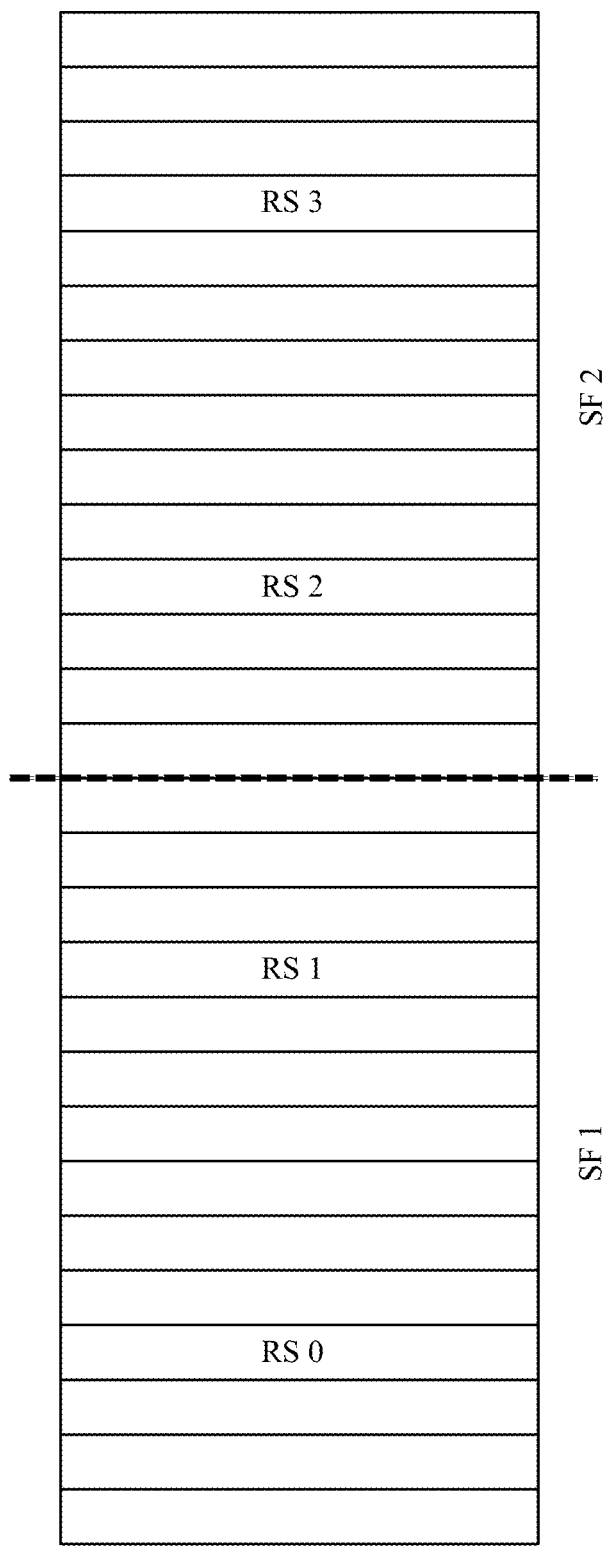
FIG. 9 is a schematic diagram of using joint channel estimation according to an embodiment.

As shown in FIG. 9, the joint channel estimation means that there are two reference signals in each of two subframes, and these reference signals are jointly used for channel estimation. Therefore, a basic condition for enabling the joint channel estimation is that a channel does not drastically change at different transmission time intervals (TTI). From a perspective of channel estimation algorithm implementation that the channel condition does not drastically change is manifested as follows: An adjacent transmission phase between different transmission is continuous. Through the joint channel estimation, a gain in time domain can be obtained, and is usually obtained while frequency hopping is implemented, and a gain in frequency domain can be obtained through frequency hopping.

Then, the pilot reusing is described by using an example. The pilot reusing may be considered as joint channel estimation in a special case. To be specific, when the channel condition slightly changes, no pilot sequence is sent on two symbols in a subframe 2 in FIG. 9, and the subframe 2 in FIG. 9 may share pilots in a subframe 1 with the subframe 1 for channel estimation, in other words, pilots of the two symbols in the subframe 2 do not need to be sent, and the pilots of the symbols in the subframe 1 are used for channel estimation. Therefore, overheads of the pilots are effectively reduced, and a system throughput is increased.

It can be learned from present disclosure that in this embodiment, the base station may semi-statically/dynamically indicate the configuration information of the reserved resource in frequency domain to the UE, and indicates that the reserved resources is the BB-level reservation or the RF-level reservation (or an interference intensity of the reserved resource). The base station may further semi-statically indicate, to the, UE whether the adjacent transmission phase is continuous. The base station may further semi-statically indicate, to the UE, whether there is the symbol shutdown behavior subsequently, or the base station may dynamically indicate, to the UE, whether the adjacent transmission phase is continuous. In this embodiment, the joint channel estimation or pilot signal reusing is enabled when a pilot and a data symbol are discontinuous. The terminal may use an appropriate receiving and processing method according to an indication of the base station for the frequency domain characteristic of the reserved resource, to filter out interference.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification are all example embodiments, and the involved actions and modules are not necessarily required by this application.

To better implement the foregoing solutions in the Embodiments, the following further provides a related apparatus configured to implement the foregoing solutions.

Referring to FIG. 10-*a*, a network device 1000 provided in an embodiment may include a resource type determining module 1001, a configuration information generation module 1002, and a sending module 1003.

The resource type determining module 1001 is configured to determine that a resource type of a reserved resource is a first-type reserved resource or a second-type reserved resource, and different resource types of the reserved resource are corresponding to different radio frequency processing manners of a terminal device.

The configuration information generation module 1002 is configured to generate configuration information of the reserved resource, and the configuration information is used to indicate type information of the resource type.

The sending module 1003 is configured to send the configuration information of the reserved resource to the terminal device.

In some Embodiments, as shown in FIG. 10-b, the resource type determining module 1001 includes:

a capability information receiving module 10011, configured to receive capability information of the terminal device that is reported by the terminal device, where the capability information of the terminal device includes at least one of the following information: information about a quantity of radio frequency filters supported by the terminal device, information about a center frequency of a radio frequency filter, information about a bandwidth supported by a radio frequency filter, and information about whether the terminal device has a frequency domain windowing capability; and a first resource type determining submodule 10012, configured to determine, based on the capability information of the terminal device, that the resource type of the reserved resource is the first-type reserved resource or the second-type reserved resource.

In some Embodiments, as shown in FIG. 10-c, the resource type determining module 1001 includes:

an interference measurement information obtaining module 10013, configured to obtain interference measurement information of the reserved resource;

an interference intensity determining module 10014, configured to determine, based on the interference measurement information, an interference intensity corresponding to the reserved resource; and a second resource type determining submodule 10015, configured to determine, based on the interference intensity corresponding to the reserved resource, that the resource type of the reserved resource is the first-type reserved resource or the second-type reserved resource.

In some embodiments, the sending module 1003 is specifically configured to: send radio resource control (RRC) signaling to the terminal device; and when a state of a first information element IE in the RRC signaling is a first state, indicate the first-type reserved resource, or when a state of a first IE in the RRC signaling is a second state, indicate the second-type reserved resource.

In some embodiments, the sending module 1003 is specifically configured to: send downlink control information DCI to the terminal device; and when a state of a first field in the DCI is a third state, indicate the first-type reserved resource, or when a state of a first field in the DCI is a fourth state, indicate the second-type reserved resource.

In some embodiments, the first-type reserved resource includes a radio frequency RF-level reserved resource, and the second-type reserved resource includes a baseband BB-level reserved resource; or the first-type reserved resource includes a high interference-type reserved resource, and the second-type reserved resource includes a low interference-type reserved resource.

In some embodiments, the sending module 1003 is further configured to send configuration information for shutdown to the terminal device, and the configuration information for shutdown is used to indicate whether the network device performs a shutdown behavior.

In some embodiments, the sending module 1003 is further configured to send phase configuration information to the terminal device, and the phase configuration information is used to indicate whether an adjacent transmission phase is continuous.

In some embodiments, the reserved resource is a time-frequency resource that is reserved by the network device for another terminal device having a different device type from the terminal device.

Referring to FIG. 11-a, a terminal device 1100 provided in an embodiment may include a receiving module 1101, a configuration information parsing module 1102, and a radio frequency processing manner determining module 1103.

The receiving module 1101 is configured to receive configuration information of a reserved resource that is sent by a network device.

The configuration information parsing module 1102 is configured to determine, based on the configuration information of the reserved resource, that a resource type of the reserved resource is a first-type reserved resource or a second-type reserved resource.

The radio frequency processing manner determining module 1103 is configured to determine a radio frequency processing manner on the reserved resource based on the resource type.

In some embodiments, the receiving module 1101 is specifically configured to receive radio resource control RRC signaling sent by the network device.

The configuration information parsing module 1102 is specifically configured to: parse a first information element IE in the RRC signaling; and when a state of the first IE is a first state, determine that the reserved resource is the first-type reserved resource, or when a state of the first IE is a second state, determine that the reserved resource is the second-type reserved resource.

In some embodiments, the receiving module 1101 is specifically configured to receive downlink control information DCI sent by the network device.

The configuration information parsing module 1102 is specifically configured to: parse a first field in the DCI; and when a state of the first field is a third state, determine that the reserved resource is the first-type reserved resource, or when a state of the first field is a fourth state, determine that the reserved resource is the second-type reserved resource.

In some embodiments, the first-type reserved resource includes a radio frequency RF-level reserved resource, and the second-type reserved resource includes a baseband BB-level reserved resource; or the first-type reserved resource includes a high interference-type reserved resource, and the second-type reserved resource includes a low interference-type reserved resource.

In some embodiments of the present invention, as shown in FIG. 11-b, the terminal device 1100 further includes a sending module 1104.

The sending module 1104 is configured to: before the receiving module 1101 receives the configuration information of the reserved resource that is sent by the network device, report capability information of the terminal device to the network device.

In some embodiments, the receiving module 1101 is further configured to receive configuration information for shutdown sent by the network device.

The configuration information parsing module 1102 is further configured to determine, based on the configuration information for shutdown, whether the network device performs a shutdown behavior.

In some embodiments, the receiving module 1101 is further configured to receive phase configuration information sent by the network device.

The configuration information parsing module 1102 is further configured to determine, based on the phase configuration information, whether an adjacent transmission phase is continuous.

In some Embodiments, the reserved resource is a time-frequency resource that is reserved by the network device for another terminal device having a different device type from the terminal device.

It should be noted that content such as information exchange between the modules/units of the apparatus and the execution processes thereof is based on the same idea as the method Embodiments, and produces the same technical effects as the method Embodiments. For the specific content, refer to the foregoing description in the method Embodiments. Details are not described herein again.

An embodiment further provides a computer storage medium. The computer storage medium stores a program, and the program is used to perform some or all of the steps described in the foregoing method embodiments.

Figure 12:
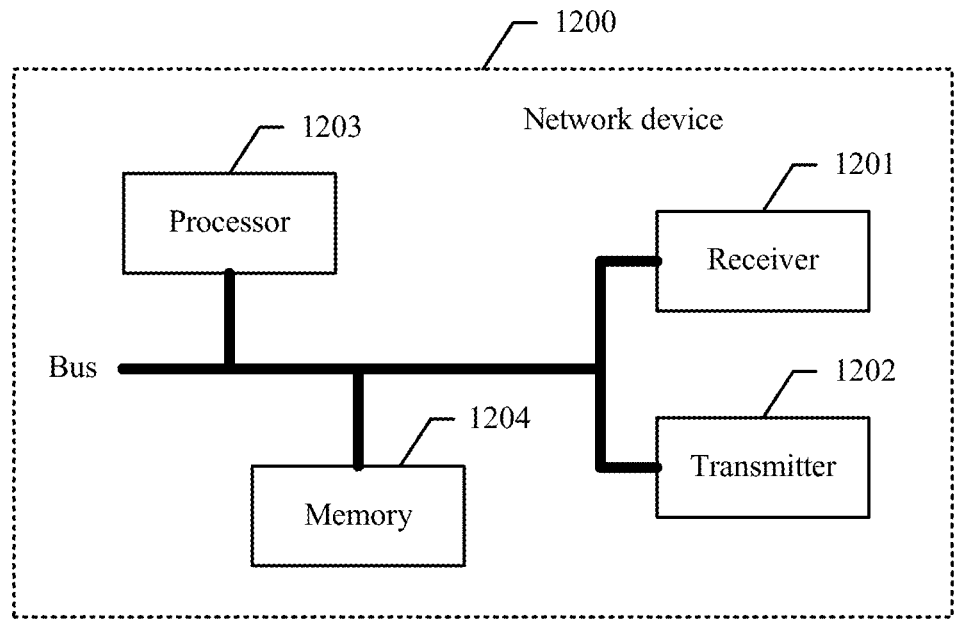
FIG. 12 is a schematic structural diagram of composition of another network device according to an embodiment.

The following describes another network device provided in an embodiment. Referring to FIG. 12, a network device 1200 includes:

a receiver 1201, a transmitter 1202, a processor 1203, and a memory 1204 (there may be one or more processors 1203 in the network device 1200, and an example in which there is one processor is used in FIG. 12). In some Embodiments, the receiver 1201, the transmitter 1202, the processor 1203, and the memory 1204 may be connected by using a bus or in another manner, and an example in which the receiver 1201, the transmitter 1202, the processor 1203, and the memory 1204 are connected by using a bus is used in FIG. 12.

The memory 1204 may include a read-only memory and a random access memory, and provide an instruction and data for the processor 1203. A part of the memory 1204 may further include a nonvolatile random access memory (English full name: Non-volatile Random Access Memory, NVRAM for short). The memory 1204 stores an operating system and an operation instruction, an executable module or a data structure, or a subset thereof, or an extended set thereof. The operation instruction may include various operation instructions, so as to implement various operations. The operating system may include various system programs, so as to implement various basic services and process hardware-based tasks.

The processor 1203 controls operations of the network device, and the processor 1203 may also be referred to as a central processing unit (English full name: Central Processing Unit, CPU for short). In specific application, the components of the network device are coupled together by using a bus system. In addition to a data bus, the bus system may further include a power bus, a control bus, a status signal bus, and the like. However, for clear description, various types of buses in the figure are referred to as the bus system.

The methods disclosed in the Embodiments may be applied to the processor 1203, or may be implemented by the processor 1203. The processor 1203 may be an integrated circuit chip and has a signal processing capability. In an implementation process, steps in the foregoing methods can be implemented by using a hardware integrated logical circuit in the processor 1203, or by using instructions in a form of software. The processor 1203 may be a general-purpose processor, a digital signal processor (English full name: digital signal processing, DSP for short), an application-specific integrated circuit (English full name: Application Specific Integrated Circuit, ASIC for short), a field-programmable gate array (English full name: Field-Programmable Gate Array, FPGA for short) or another programmable logical device, a discrete gate or transistor logic device, or a discrete hardware component. It may implement or perform the methods, the steps, and logical block diagrams that are disclosed in the Embodiments. The general-purpose processor may be a microprocessor, or the processor may be any conventional processor or the like. Steps of the methods disclosed with reference to the Embodiments may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1204, and the processor 1203 reads information in the memory 1204 and completes the steps in the foregoing methods in combination with hardware of the processor.

The receiver 1201 may be configured to: receive input digital or character information, and generate a signal input related to a related setting and function control of the network device. The transmitter 1202 may include a display device such as a display screen, and the transmitter 1202 may be configured to output digital or character information by using an external interface.

In this embodiment, the processor 1203 is configured to perform the foregoing information indication method.

Figure 13:
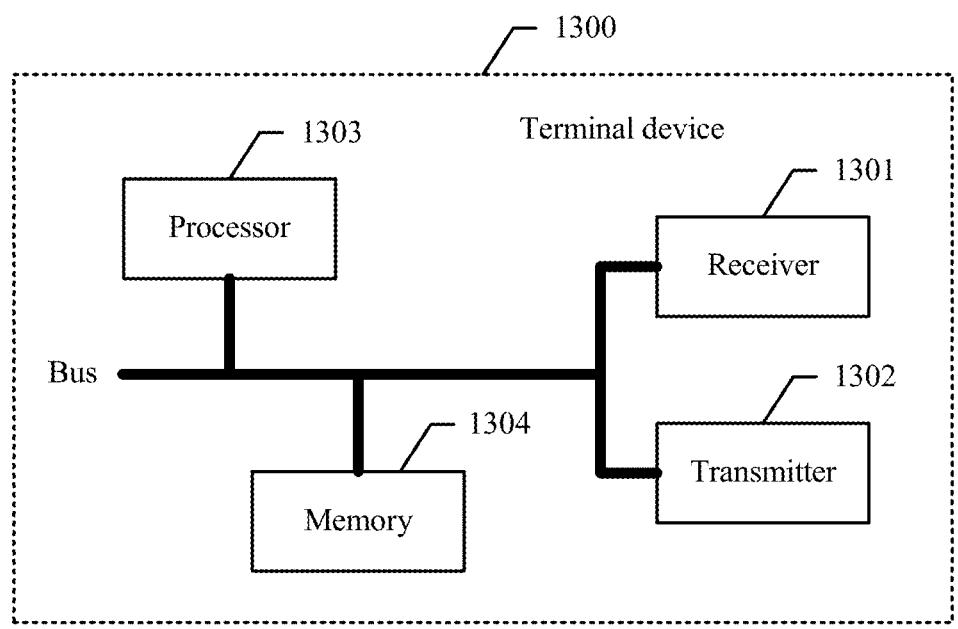
FIG. 13 is a schematic structural diagram of composition of another terminal device according to an embodiment.

The following describes another terminal device provided in an embodiment. Referring to FIG. 13, a terminal device 1300 includes:

a receiver 1301, a transmitter 1302, a processor 1303, and a memory 1304 (there may be one or more processors 1303 in the terminal device 1300, and an example in which there is one processor is used in FIG. 13). In some Embodiments, the receiver 1301, the transmitter 1302, the processor 1303, and the memory 1304 may be connected by using a bus or in another manner, and an example in which the receiver 1301, the transmitter 1302, the processor 1303, and the memory 1304 are connected by using a bus is used in FIG. 13.

The memory 1304 may include a read-only memory and a random access memory, and provide an instruction and data for the processor 1303. A part of the memory 1304 may further include an NVRAM. The memory 1304 stores an operating system and an operation instruction, an executable module or a data structure, or a subset thereof, or an extended set thereof. The operation instruction may include various operation instructions, so as to implement various operations. The operating system may include various system programs, so as to implement various basic services and process hardware-based tasks.

The processor 1303 controls operations of the terminal device, and the processor 1303 may also be referred to as a CPU. In specific application, the components of the terminal device are coupled together by using a bus system. In addition to a data bus, the bus system may further include a power bus, a control bus, a status signal bus, and the like.

However, for clear description, various types of buses in the figure are referred to as the bus system.

The methods disclosed in the Embodiments may be applied to the processor 1303, or may be implemented by the processor 1303. The processor 1303 may be an integrated circuit chip and has a signal processing capability. In an implementation process, steps in the foregoing methods can be implemented by using a hardware integrated logical circuit in the processor 1303, or by using instructions in a form of software. The processor 1303 may be a general-purpose processor, a DSP, an ASIC, an FPGA or another programmable logic device, a discrete gate or a transistor logic device, or a discrete hardware component. It may implement or perform the methods, the steps, and logical block diagrams that are disclosed in the Embodiments. The general-purpose processor may be a microprocessor, or the processor may be any conventional processor or the like. Steps of the methods disclosed with reference to the Embodiments may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1304, and the processor 1303 reads information in the memory 1304 and completes the steps in the foregoing methods in combination with hardware of the processor.

In this embodiment, the processor 1303 is configured to perform the foregoing information processing method.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the Embodiments.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the Embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Disk (SSD)), or the like.

What is claimed is:

1. An information processing method, comprising:
receiving, by a terminal device, configuration information of a reserved resource sent by a network device;
determining, by the terminal device based on the configuration information of the reserved resource, that a resource type of the reserved resource is a first-type reserved resource or a second-type reserved resource;
determining, by the terminal device, a radio frequency processing manner on the reserved resource based on the resource type;
receiving, by the terminal device, phase configuration information sent by the network device; and
determining, by the terminal device, based on the phase configuration information, whether an adjacent transmission phase is continuous.

2. The method according to claim 1, wherein receiving, by the terminal device, configuration information of a reserved resource sent by the network device comprises:
receiving, by the terminal device, downlink control information (DCI) sent by the network device; and, wherein determining, by the terminal device based on the configuration information of the reserved resource, that the resource type of the reserved resource is a first-type reserved resource or a second-type reserved resource comprises:
parsing, by the terminal device, a first field in the DCI;
when a state of the first field is a third state, determining that the reserved resource is the first-type reserved resource; and
when a state of the first field is a fourth state, determining that the reserved resource is the second-type reserved resource.

3. The method according to claim 1, wherein the first-type reserved resource comprises a radio frequency (RF)-level reserved resource, and the second-type reserved resource comprises a baseband BB-level reserved resource; or
the first-type reserved resource comprises a high interference-type reserved
resource, and the second-type reserved resource comprises a low interference-type reserved resource.

4. The method according to claim 1, wherein before the receiving, by the terminal device, the configuration information of the reserved resource that is sent by a network device, the method further comprises:
reporting, by the terminal device, capability information of the terminal device to the network device.

5. The method according to claim 4, wherein the capability information of the terminal device comprises at least one of the following information: information about a quantity of radio frequency filters supported by the terminal device, information about a center frequency of a radio frequency filter, information about a bandwidth supported by a radio frequency filter, or information about whether the terminal device has a frequency domain windowing capability.

6. The method according to claim 1, wherein the method further comprises:
receiving, by the terminal device, configuration information for shutdown sent by the network device; and
determining, by the terminal device based on the configuration information for shutdown, whether the network device performs a shutdown behavior.

7. The method according to claim 1, wherein the reserved resource is a time-frequency resource reserved by the network device for another terminal device having a different device type from the terminal device.

8. A terminal device, wherein the terminal device comprises a processor, memory, a transmitter, and a receiver, wherein
the receiver is configured to receive configuration information of a reserved resource sent by a network device;
the memory is configured to store data and instructions of the receiver and the processor; and
the processor is configured to:
determine, based on the configuration information of the reserved resource, that a resource type of the reserved resource is a first-type reserved resource or a second-type reserved resource; and
determine a radio frequency processing manner on the reserved resource based on the resource type, wherein
the receiver is further configured to receive phase configuration information sent by the network device; and
the processor is further configured to determine, based on the phase configuration information, whether an adjacent transmission phase is continuous.

9. The terminal device according to claim 8, wherein the receiver is specifically configured to receive radio resource control (RRC) signaling sent by the network device; and
the processor is configured to:
parse a first information element (IE) in the RRC signaling;
when a state of the first IE is a first state, determine that the reserved resource is the first-type reserved resource; and
when a state of the first IE is a second state, determine that the reserved resource is the second-type reserved resource.

10. The terminal device according to claim 8, wherein the receiver is configured to receive downlink control information (DCI) sent by the network device; and
the processor is configured to:
parse a first field in the DCI;
when a state of the first field is a third state, determine that the reserved resource is the first-type reserved resource; and
when a state of the first field is a fourth state, determine that the reserved resource is the second-type reserved resource.

11. The terminal device according to claim 8, wherein
the first-type reserved resource stored in the memory comprises a radio frequency (RF)-level reserved resource, and the second-type reserved resource comprises a baseband BB-level reserved resource; or
the first-type reserved resource comprises a high interference-type reserved resource, and the second-type reserved resource comprises a low interference-type reserved resource.

12. The terminal device according to claim 8, wherein the transmitter is configured to: before the receiver receives the configuration information of the reserved resource sent by the network device, report capability information of the terminal device to the network device.

13. The terminal device according to claim 12, wherein the capability information of the terminal device stored in the memory comprises at least one of the following information: information about a quantity of radio frequency filters supported by the terminal device, information about a center frequency of a radio frequency filter, information about a bandwidth supported by a radio frequency filter, or information about whether the terminal device has a frequency domain windowing capability.

14. The terminal device according to claim 8, wherein the receiver is further configured to receive configuration information for shutdown sent by the network device; and
the processor is further configured to determine, based on the configuration information for shutdown, whether the network device performs a shutdown behavior.

15. The terminal device according to claim 8, wherein the reserved resource stored in the memory is a time-frequency resource that is reserved by the network device for another terminal device having a different device type from the terminal device.

16. The method according to claim 1, wherein receiving, by the terminal device, configuration information of a reserved resource sent by the network device comprises:
receiving, by the terminal device, radio resource control (RRC) signaling sent by the network device; and, wherein
determining, by the terminal device based on the configuration information of the reserved resource, that the resource type of the reserved resource is the first-type reserved resource or the second-type reserved resource comprises:
parsing, by the terminal device, a first information element (IE) in the RRC signaling;
when a state of the first IE is a first state, determining that the reserved resource is the first-type reserved resource; and
when a state of the first IE is a second state, determining, by the terminal device, that the reserved resource is the second-type reserved resource.

* * * * *